(12) United States Patent
Lee et al.

(10) Patent No.: US 10,992,163 B2
(45) Date of Patent: Apr. 27, 2021

(54) MOBILE TERMINAL

(71) Applicant: LG ELECTRONICS INC., Seoul (KR)

(72) Inventors: Suyoung Lee, Seoul (KR); Jisun Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 180 days.

(21) Appl. No.: 16/319,727

(22) PCT Filed: Jun. 2, 2017

(86) PCT No.: PCT/KR2017/005779
§ 371 (c)(1),
(2) Date: Jan. 22, 2019

(87) PCT Pub. No.: WO2018/030619
PCT Pub. Date: Feb. 15, 2018

(65) Prior Publication Data
US 2019/0280504 A1    Sep. 12, 2019

(30) Foreign Application Priority Data

Aug. 12, 2016 (KR) .......................... 10-2016-0102952

(51) Int. Cl.
*H02J 7/00* (2006.01)
*H02J 7/34* (2006.01)
(Continued)

(52) U.S. Cl.
CPC ................ *H02J 7/342* (2020.01); *H02J 7/00* (2013.01); *H02J 7/0063* (2013.01);
(Continued)

(58) Field of Classification Search
CPC ....... Y02E 60/12; H02J 7/0054; H02J 7/1423; H02J 7/00045; H01M 10/44; H01M 10/46
See application file for complete search history.

(56) References Cited

U.S. PATENT DOCUMENTS 9,431,842 B1 *   8/2016   Noble, Jr. ........... H02J 7/00712
9,450,432 B1 *   9/2016   Burns ..................... H02J 7/342
(Continued)

FOREIGN PATENT DOCUMENTS

KR    10-2003-0046074 A    6/2003
KR    10-2006-0073297 A    6/2006
(Continued)

*Primary Examiner* — Arun C Williams
(74) *Attorney, Agent, or Firm* — Birch, Stewart, Kolasch & Birch, LLP

(57) ABSTRACT

The present invention relates to a mobile terminal, and more particularly, a mobile terminal for transmitting and/or receiving power and data to or from another mobile terminal connected thereto through a cable. A first mobile terminal according to an embodiment of the present invention may include a memory configured to store data, a display unit configured to enable information to be input or output therethrough, an interface unit connected to a cable through which at least one of data and power is transmitted, and a controller, wherein the controller may obtain, through the cable, connection information about the first mobile terminal and a second mobile terminal and may transmit or receive at least one of the data and the power to or from the second mobile through the cable. Accordingly, the first mobile terminal may transmit or receive power to or from another mobile terminal connected to the cable and may select a mobile terminal supplied with power and a mobile terminal supplying power from among a plurality of mobile terminals.

20 Claims, 20 Drawing Sheets

(51) Int. Cl.
  *H04M 1/02* (2006.01)
  *H04M 1/725* (2021.01)

(52) U.S. Cl.
  CPC .............. *H02J 7/0069* (2020.01); *H04M 1/02* (2013.01); *H04M 1/725* (2013.01); *H02J 7/00034* (2020.01); *H02J 2007/0067* (2013.01); *Y02D 30/70* (2020.08)

(56) References Cited

U.S. PATENT DOCUMENTS

| | | | | |
|---|---|---|---|---|
| 2001/0034245 | A1* | 10/2001 | Swartz | H04M 1/725 455/557 |
| 2002/0056085 | A1* | 5/2002 | Fahraeus | H04W 4/12 725/1 |
| 2002/0073140 | A1* | 6/2002 | Chae | H04L 67/06 709/201 |
| 2007/0124583 | A1* | 5/2007 | Andersson | G06F 21/10 713/165 |
| 2008/0054842 | A1* | 3/2008 | Kim | H01M 16/006 320/101 |
| 2009/0132613 | A1* | 5/2009 | Lakshmipathy | G06F 11/1446 |
| 2009/0208818 | A1* | 8/2009 | Poff | H01M 2/1066 429/50 |
| 2010/0077058 | A1* | 3/2010 | Messer | G06F 9/452 709/219 |
| 2011/0060999 | A1* | 3/2011 | So | G06F 9/452 715/740 |
| 2012/0016930 | A1* | 1/2012 | So | H04L 12/281 709/203 |
| 2013/0320913 | A1* | 12/2013 | Chen | G06F 1/263 320/103 |
| 2015/0364943 | A1* | 12/2015 | Vick | H02J 50/10 320/108 |
| 2016/0049818 | A1* | 2/2016 | Yao | H02J 7/342 320/103 |
| 2016/0079781 | A1* | 3/2016 | Kyriakoulis | H02J 7/0042 320/114 |
| 2016/0087468 | A1* | 3/2016 | Walls | H02J 7/0044 320/114 |

FOREIGN PATENT DOCUMENTS

| | | |
|---|---|---|
| KR | 10-2009-0068940 A | 6/2009 |
| KR | 10-2013-0108903 A | 10/2013 |
| KR | 10-2014-0008784 A | 1/2014 |

* cited by examiner

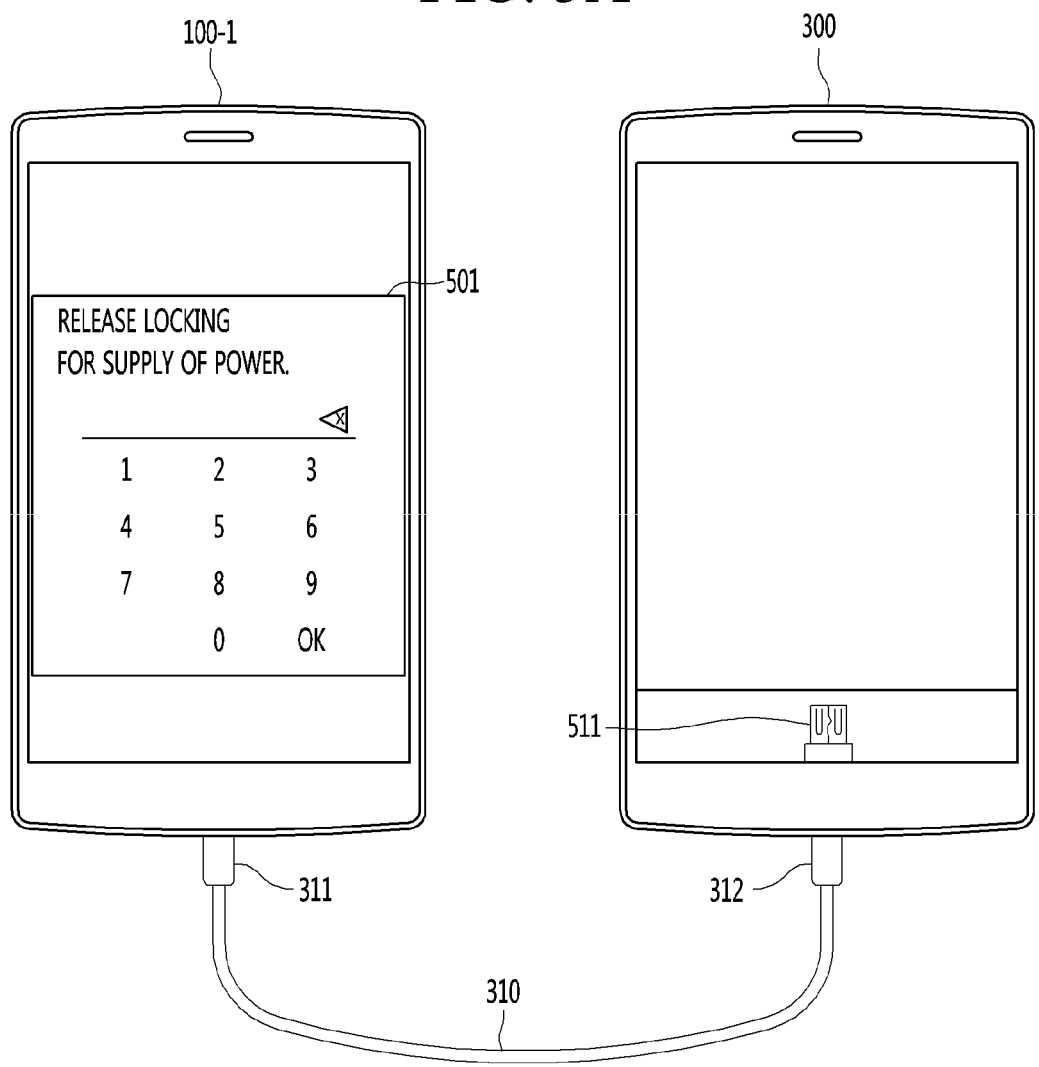

MOBILE TERMINAL

CROSS-REFERENCE TO RELATED APPLICATIONS

This application is the National Phase of PCT International Application No. PCT/KR2017/005779, filed on Jun. 2, 2017, which claims priority under 35 U.S.C. 119(a) to Patent Application No. 10-2016-0102952, filed in the Republic of Korea on Aug. 12, 2016, all of which are hereby expressly incorporated by reference into the present application.

BACKGROUND OF THE INVENTION

Field of the Invention

The present invention relates to a mobile terminal, and more particularly, a mobile terminal for transmitting and/or receiving power and data to or from another mobile terminal connected thereto through a cable.

Discussion of the Related Art

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

As such functions become more diversified, the mobile terminal can support more complicated functions such as capturing images or video, reproducing music or video files, playing games, receiving broadcast signals, and the like. By comprehensively and collectively implementing such functions, the mobile terminal may be embodied in the form of a multimedia player or device.

Efforts are ongoing to support and increase the functionality of mobile terminals. Such efforts include software and hardware improvements, as well as changes and improvements in the structural components. Mobile terminals may be supplied with power through a universal serial bus (USB) terminal and may be connected to another terminal to transmit and/or receive data to or from the other terminal.

Recently, a function of transmitting and/or receiving data and charged power to or from another mobile by using the USB terminal is provided.

Therefore, a method for more conveniently using a function of transmitting and/or receiving data and charged power to or from another mobile is more needed.

SUMMARY OF THE INVENTION

The present invention is directed to providing a mobile terminal which may transmit and/or receive power to or from another mobile terminal connected thereto through a cable and may select a mobile terminal supplied with power and a mobile supplying power from among a plurality of mobile terminals.

Moreover, the present invention is directed to providing a mobile terminal which may transmit and/or receive data to or from another mobile terminal connected thereto through a cable and may set a data transmission and/or reception method.

A first mobile terminal according to an embodiment of the present invention may include a memory configured to store data, a display unit configured to enable information to be input or output therethrough, an interface unit connected to a cable through which at least one of data and power is transmitted, and a controller, wherein the controller may obtain, through the cable, connection information about the first mobile terminal and a second mobile terminal and may transmit or receive at least one of the data and the power to or from the second mobile through the cable.

A first mobile terminal according to another embodiment of the present invention may include a memory configured to store data, a display unit configured to enable information to be input or output therethrough, an interface unit connected to a cable through which at least one of data and power is transmitted, and a controller, wherein, when the cable connected to the second mobile terminal is connected to the interface unit, the controller may assigns, to the second mobile terminal, an authority to control a portion of the first mobile terminal, get an authority to control a portion of the second mobile terminal, and control the second mobile terminal according to the assigned authority to transmit or receive at least one of data and power to or from the second mobile terminal.

It is to be understood that both the foregoing general description and the following detailed description of the present invention are exemplary and explanatory and are intended to provide further explanation of the invention as claimed.

Advantageous Effects

According to various embodiments of the present invention, a mobile terminal of the present invention may transmit and/or receive power to or from another mobile terminal connected thereto through a cable and may select a mobile terminal supplied with power and a mobile supplying power from among a plurality of mobile terminals.

Moreover, a mobile terminal of the present invention may transmit and/or receive data to or from another mobile terminal connected thereto through a cable and may set a data transmission and/or reception method.

BRIEF DESCRIPTION OF THE DRAWINGS

FIGS. 3A and 3B are diagrams for describing power transmission and/or reception between a plurality of mobile terminals connected to a cable, associated with an embodiment of the present invention.

FIGS. 5A and 5B are diagrams for describing power transmission and/or reception between a plurality of mobile terminals connected to a cable, associated with another embodiment of the present invention.

DETAILED DESCRIPTION OF THE EMBODIMENTS

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
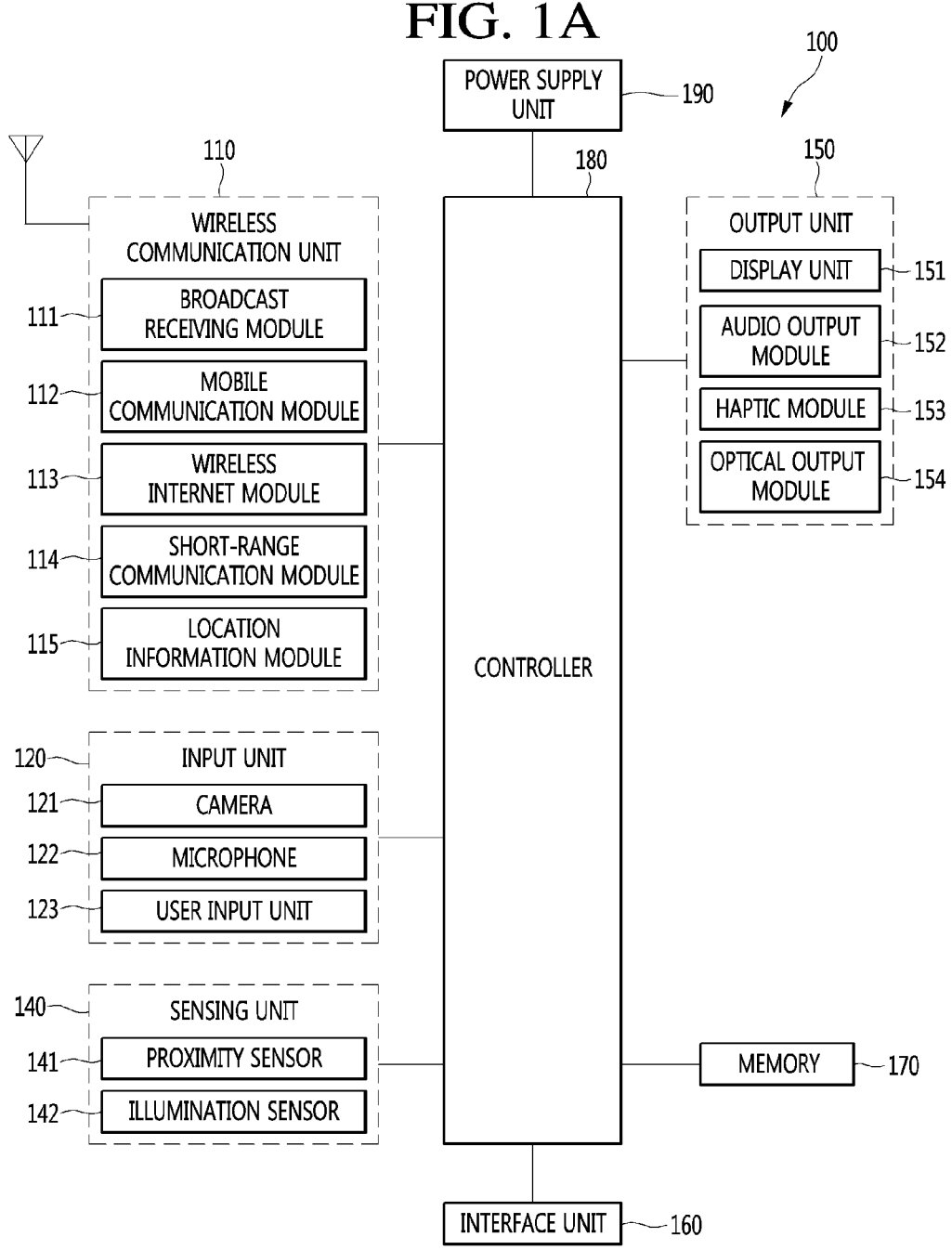
FIG. 1A is a block diagram for describing a mobile terminal associated with the present invention.
Figure 1B:
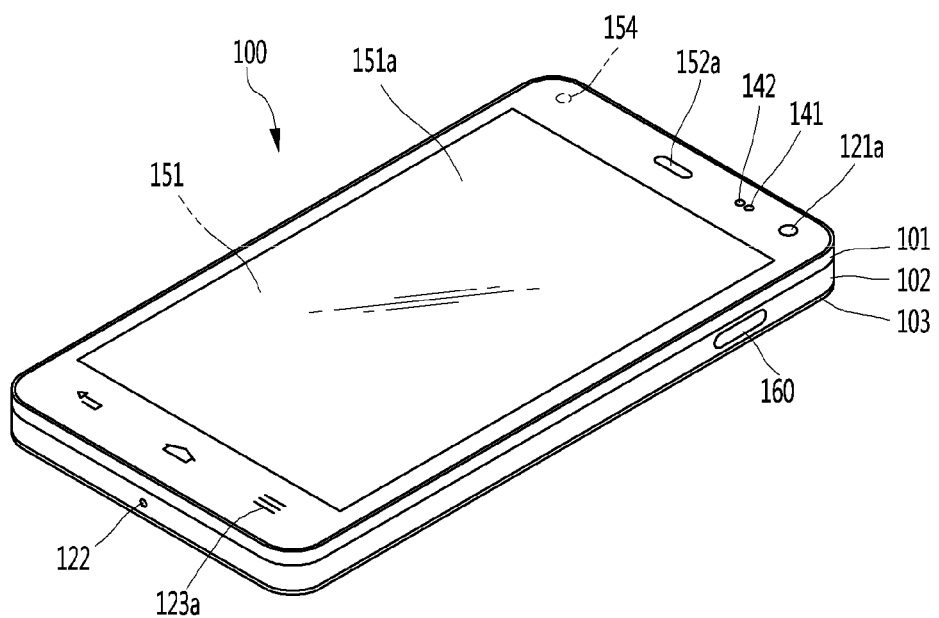
FIGS. 1B and 1C are conceptual diagrams when an example of a mobile terminal associated with the present invention is seen in different directions.
Figure 1C:
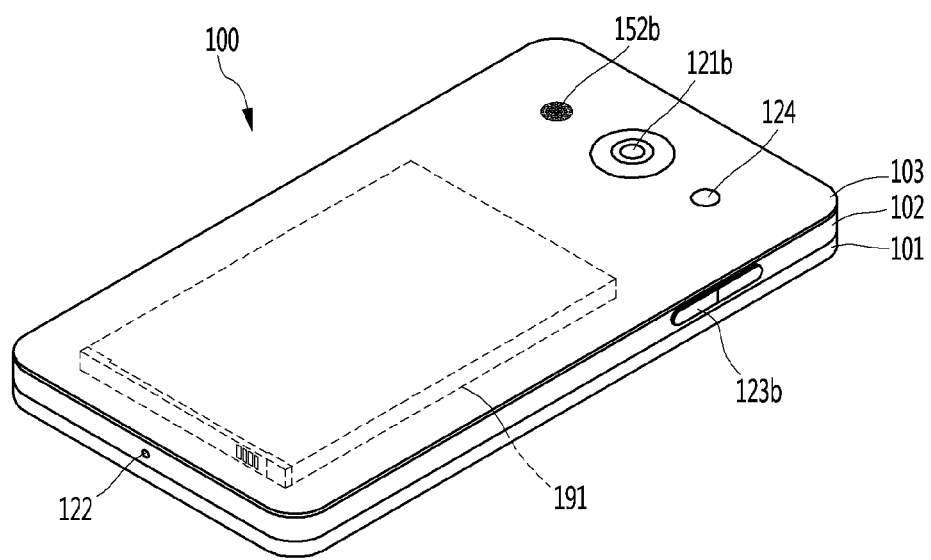

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The broadcast managing entity may be a server which generates and transmits a broadcast signal and/or broadcast associated information, or a server which receives a pre-generated broadcast signal and/or broadcast associated information, and sends such items to the mobile terminal.

The broadcast signal may be implemented using any of a TV broadcast signal, a radio broadcast signal, a data broadcast signal, and combinations thereof, among others. The broadcast signal in some cases may further include a data broadcast signal combined with a TV or radio broadcast signal.

The broadcast signal may be encoded according to any of a variety of technical standards or broadcasting methods (for example, International Organization for Standardization (ISO), International Electrotechnical Commission (IEC), Digital Video Broadcast (DVB), Advanced Television Systems Committee (ATSC), and the like) for transmission and reception of digital broadcast signals. The broadcast receiving module 111 can receive the digital broadcast signals using a method appropriate for the transmission method utilized.

Examples of broadcast associated information may include information associated with a broadcast channel, a broadcast program, a broadcast event, a broadcast service provider, or the like. The broadcast associated information may also be provided via a mobile communication network, and in this case, received by the mobile communication module 112.

The broadcast associated information may be implemented in various formats. For instance, broadcast associated information may include an Electronic Program Guide (EPG) of Digital Multimedia Broadcasting (DMB), an Electronic Service Guide (ESG) of Digital Video Broadcast-Handheld (DVB-H), and the like. Broadcast signals and/or broadcast associated information received via the broadcast receiving module 111 may be stored in a suitable device, such as a memory 170.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

In general, a 3D stereoscopic image may include a left image (e.g., a left eye image) and a right image (e.g., a right eye image). According to how left and right images are combined into a 3D stereoscopic image, a 3D stereoscopic imaging method can be divided into a top-down method in which left and right images are located up and down in a frame, an L-to-R (left-to-right or side by side) method in which left and right images are located left and right in a frame, a checker board method in which fragments of left and right images are located in a tile form, an interlaced method in which left and right images are alternately located by columns or rows, and a time sequential (or frame by frame) method in which left and right images are alternately displayed on a time basis.

Also, as for a 3D thumbnail image, a left image thumbnail and a right image thumbnail can be generated from a left image and a right image of an original image frame, respectively, and then combined to generate a single 3D thumbnail image. In general, the term "thumbnail" may be used to refer to a reduced image or a reduced still image. A generated left image thumbnail and right image thumbnail may be displayed with a horizontal distance difference there between by a depth corresponding to the disparity between the left image and the right image on the screen, thereby providing a stereoscopic space sense.

A left image and a right image required for implementing a 3D stereoscopic image may be displayed on the stereoscopic display unit using a stereoscopic processing unit. The stereoscopic processing unit can receive the 3D image and extract the left image and the right image, or can receive the 2D image and change it into a left image and a right image.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal includes a display unit 151, a first and a second audio output modules 151a/151b, a proximity sensor 141, an illumination sensor 142, an optical output module 154, a first and a second cameras 121a/121b, a first and a second manipulation units 123a/123b, a microphone 122, interface unit 160 and the like.

It will be described for the mobile terminal as shown in FIGS. 1B and 1C. The display unit 151, the first audio output module 151a, the proximity sensor 141, an illumination sensor 142, the optical output module 154, the first camera 121a and the first manipulation unit 123a are arranged in front surface of the terminal body, the second manipulation unit 123b, the microphone 122 and interface unit 160 are arranged in side surface of the terminal body, and the second audio output modules 151b and the second camera 121b are arranged in rear surface of the terminal body.

However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Figure 2:
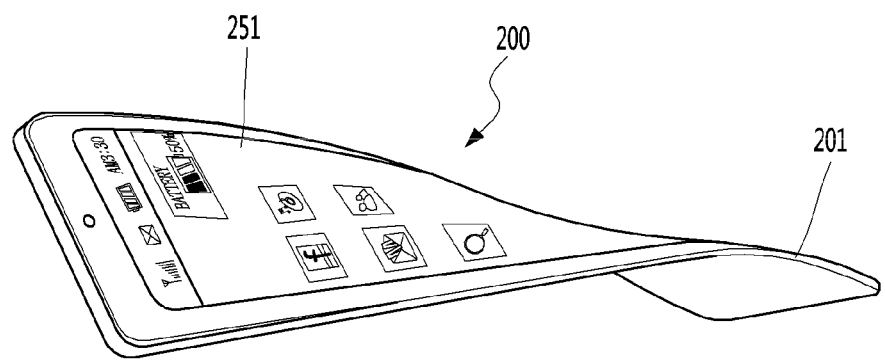
FIG. 2 is a conceptual diagram for describing another example of a modifiable mobile terminal according to the present invention.

FIG. 2 is a conceptual view of a deformable mobile terminal according to an alternative embodiment of the present invention. In this figure, mobile terminal 200 is shown having display unit 251, which is a type of display that is deformable by an external force. This deformation, which includes display unit 251 and other components of mobile terminal 200, may include any of curving, bending, folding, twisting, rolling, and combinations thereof. The deformable display unit 251 may also be referred to as a "flexible display unit." In some implementations, the flexible display unit 251 may include a general flexible display, electronic paper (also known as e-paper), and combinations thereof. In general, mobile terminal 200 may be configured to include features that are the same or similar to that of mobile terminal 100 of FIGS. 1A-1C.

The flexible display of mobile terminal 200 is generally formed as a lightweight, non-fragile display, which still exhibits characteristics of a conventional flat panel display, but is instead fabricated on a flexible substrate which can be deformed as noted previously.

The term e-paper may be used to refer to a display technology employing the characteristic of a general ink, and is different from the conventional flat panel display in view of using reflected light. E-paper is generally understood as changing displayed information using a twist ball or via electrophoresis using a capsule.

When in a state that the flexible display unit 251 is not deformed (for example, in a state with an infinite radius of curvature and referred to as a first state), a display region of the flexible display unit 251 includes a generally flat surface. When in a state that the flexible display unit 251 is deformed from the first state by an external force (for example, a state with a finite radius of curvature and referred to as a second state), the display region may become a curved surface or a bent surface. As illustrated, information displayed in the second state may be visual information output on the curved surface. The visual information may be realized in such a manner that a light emission of each unit pixel (sub-pixel) arranged in a matrix configuration is controlled independently. The unit pixel denotes an elementary unit for representing one color.

According to one alternative embodiment, the first state of the flexible display unit 251 may be a curved state (for example, a state of being curved from up to down or from right to left), instead of being in flat state. In this embodiment, when an external force is applied to the flexible display unit 251, the flexible display unit 251 may transition to the second state such that the flexible display unit is deformed into the flat state (or a less curved state) or into a more curved state.

If desired, the flexible display unit 251 may implement a flexible touch screen using a touch sensor in combination with the display. When a touch is received at the flexible touch screen, the controller 180 can execute certain control corresponding to the touch input. In general, the flexible touch screen is configured to sense touch and other input while in both the first and second states.

One option is to configure the mobile terminal 200 to include a deformation sensor which senses the deforming of the flexible display unit 251. The deformation sensor may be included in the sensing unit 140.

The deformation sensor may be located in the flexible display unit 251 or the case 201 to sense information related to the deforming of the flexible display unit 251. Examples of such information related to the deforming of the flexible display unit 251 may be a deformed direction, a deformed degree, a deformed position, a deformed amount of time, an acceleration that the deformed flexible display unit 251 is restored, and the like. Other possibilities include most any type of information which can be sensed in response to the curving of the flexible display unit or sensed while the flexible display unit 251 is transitioning into, or existing in, the first and second states.

In some embodiments, controller 180 or other component can change information displayed on the flexible display unit 251, or generate a control signal for controlling a function of the mobile terminal 200, based on the information related to the deforming of the flexible display unit 251. Such information is typically sensed by the deformation sensor.

The mobile terminal 200 is shown having a case 201 for accommodating the flexible display unit 251. The case 201 can be deformable together with the flexible display unit 251, taking into account the characteristics of the flexible display unit 251.

A battery (not shown in this figure) located in the mobile terminal 200 may also be deformable in cooperation with the flexible display unit 261, taking into account the characteristic of the flexible display unit 251. One technique to implement such a battery is to use a stack and folding method of stacking battery cells.

The deformation of the flexible display unit 251 not limited to perform by an external force. For example, the flexible display unit 251 can be deformed into the second state from the first state by a user command, application command, or the like.

In accordance with still further embodiments, a mobile terminal may be configured as a device which is wearable on a human body. Such devices go beyond the usual technique of a user grasping the mobile terminal using their hand. Examples of the wearable device include a smart watch, a smart glass, a head mounted display (HMD), and the like.

A typical wearable device can exchange data with (or cooperate with) another mobile terminal 100. In such a device, the wearable device generally has functionality that is less than the cooperating mobile terminal. For instance, the short-range communication module 114 of a mobile terminal 100 may sense or recognize a wearable device that is near-enough to communicate with the mobile terminal. In addition, when the sensed wearable device is a device which is authenticated to communicate with the mobile terminal 100, the controller 180 may transmit data processed in the mobile terminal 100 to the wearable device via the short-range communication module 114, for example. Hence, a user of the wearable device can use the data processed in the mobile terminal 100 on the wearable device. For example, when a call is received in the mobile terminal 100, the user can answer the call using the wearable device. Also, when a message is received in the mobile terminal 100, the user can check the received message using the wearable device.

Figure 3A:
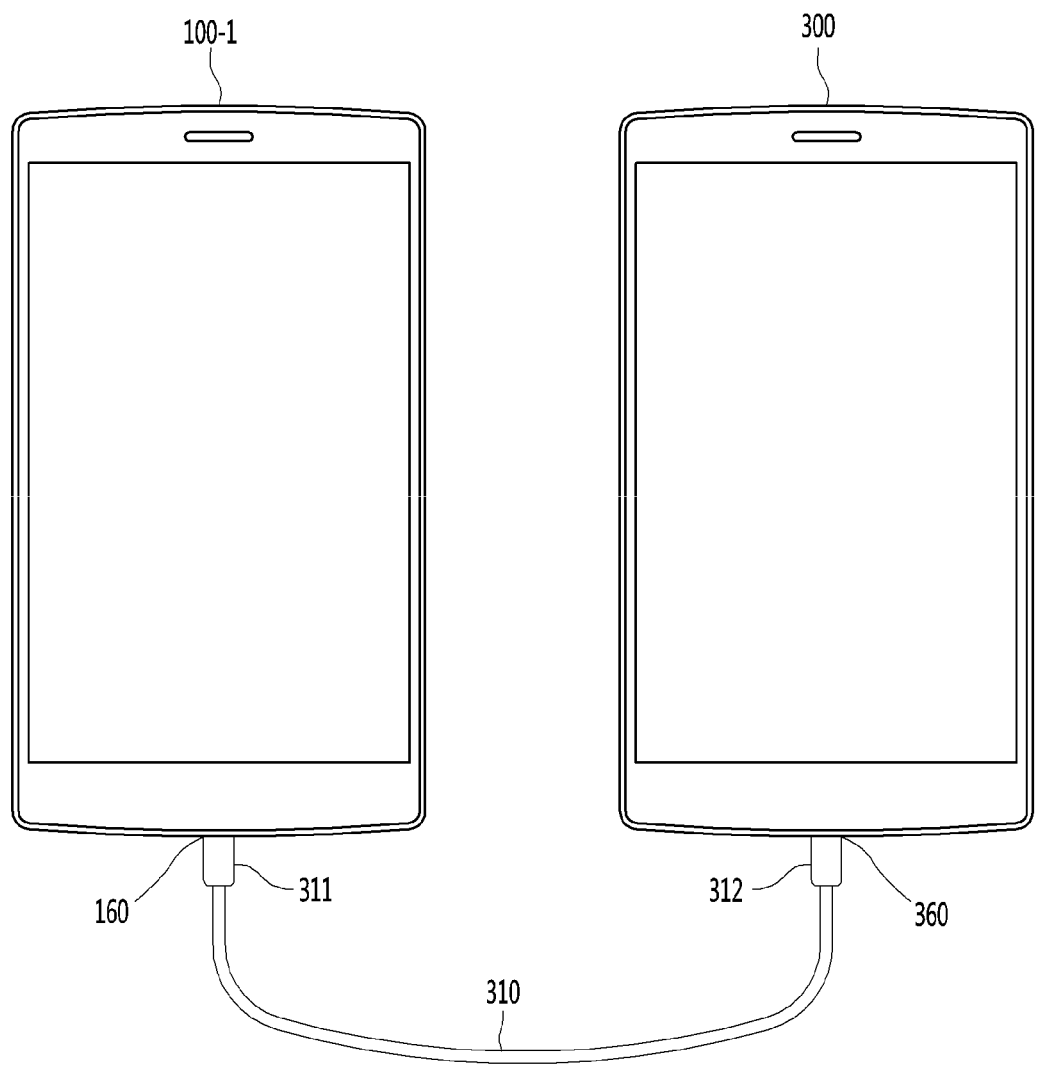
FIG. 3A is a conceptual diagram for describing a plurality of mobile terminals connected to a cable, associated with an embodiment of the present invention.

FIG. 3A is a conceptual diagram for describing a plurality of mobile terminals connected to a cable, associated with an embodiment of the present invention.

Referring to FIG. 3A, a plurality of mobile terminals connected to a cable according to an embodiment of the present invention may include a first mobile terminal 100-1, a second mobile terminal 300, and a cable.

The first mobile terminal 100-1 and the second mobile terminal 300 may be a kind of the mobile terminal 100. Therefore, a configuration of each of the first mobile terminal 100-1 and the second mobile terminal 300 may be the same as that of the mobile terminal 100 described above with reference to FIGS. 1A to 2. Therefore, the mobile terminal 100 will be described below through the first mobile terminal 100-1 and the second mobile terminal 300, and it is obvious that, even when a position of the first mobile terminal 100-1 and a position of the second mobile terminal 300 switch therebetween, description is the same.

The cable is connected to an interface unit 160 of the first mobile terminal 100-1 and an interface unit 360 of the second mobile terminal 300 and acts as a path for transmitting and/or receiving data and power to or from an external device. The cable may be implemented as a line type where connectors 311 and 312 are provided in both ends thereof. Therefore, even when the connectors 311 and 312 are connected to the first mobile terminal 100-1 and the second mobile terminal 300 through crossing, the first mobile terminal 100-1 and the second mobile terminal 300 may perform the same function in comparison with a before-crossing function. Also, since an upper portion and a lower portion of each of the connectors 311 and 312 are not differentiated from each other, the connectors 311 and 312 may be connected to the interface units 160 and 360 regardless of a direction.

Moreover, the connectors 311 and 312 may be implemented as different types, and in this case, the connectors 311 and 312 may be connected to the mobile terminal 100 by using a separate gender.

The cable may be a USB cable, and preferably, may be a cable of a USB C type. That is, the cable connects the first mobile terminal 100-1 to the second mobile terminal 300, and a kind thereof is not limited thereto.

The first mobile terminal 100-1 and the second mobile terminal 300 may be connected to each other through the interface units 160 and 360 thereof. The first mobile terminal 100-1 and the second mobile terminal 300 connected to each other may transmit and/or receive data and power, and a detailed method will be described below.

Figure 3B:
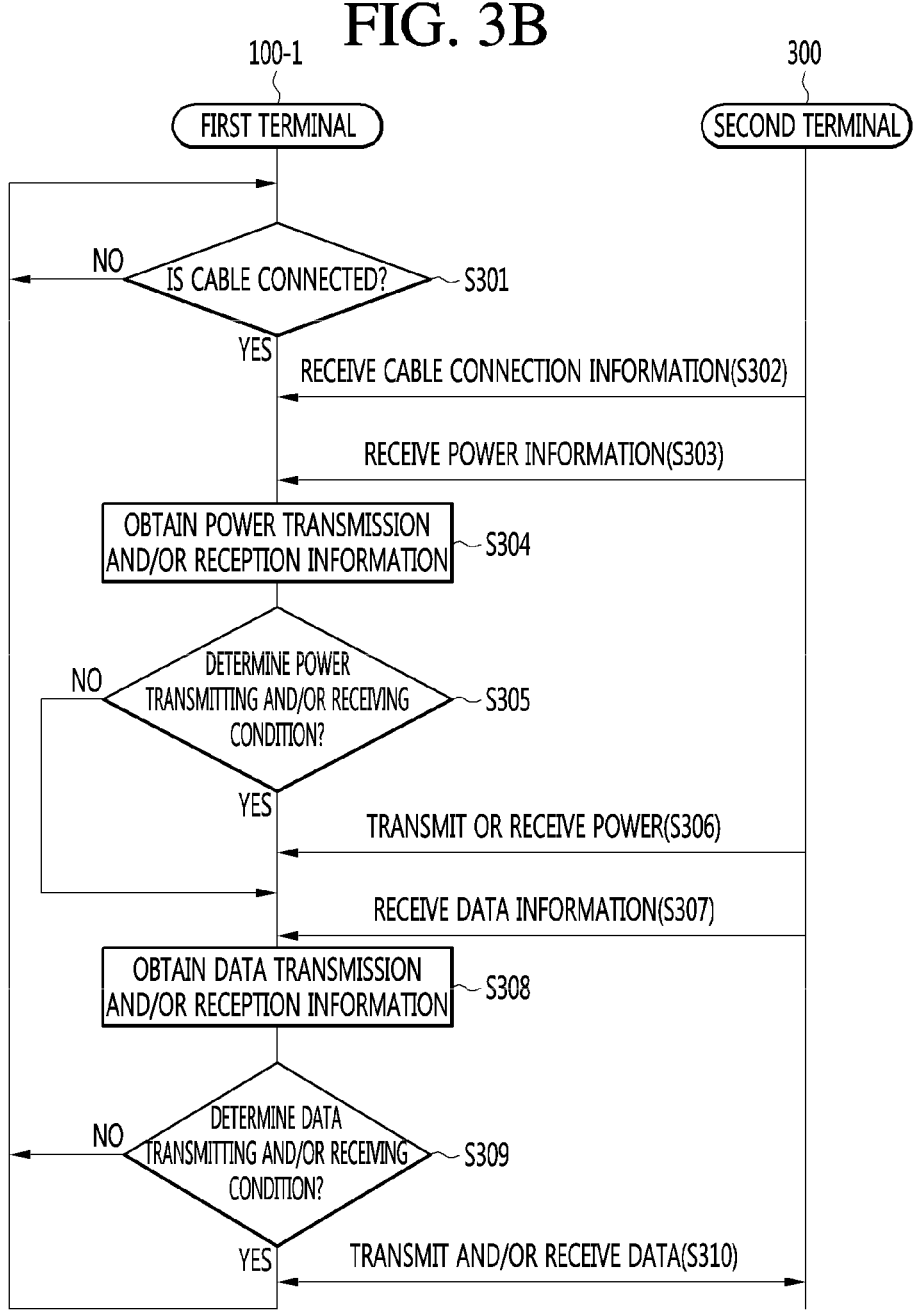
FIG. 3B is a flowchart for describing a method of transmitting and/or receiving power and data between a plurality of mobile terminals connected to a cable, associated with an embodiment of the present invention.

FIG. 3B is a flowchart for describing a method of transmitting and/or receiving power and data between a plurality of mobile terminals connected to a cable, associated with an embodiment of the present invention.

Hereinafter, the first mobile terminal 100-1 will be described in conjunction with the descriptions of FIGS. 1A to 3A. Also, a configuration of the first mobile terminal 100-1 is the same as that of the mobile terminal 100, and thus, the first mobile terminal 100-1 will be described by using a lower configuration of the mobile terminal 100.

Referring to FIG. 3B, the method of transmitting and/or receiving power and data between a plurality of mobile terminals connected to a cable associated with an embodiment of the present invention may include step S301 of determining whether the cable is connected, step S302 of receiving cable connection information about the second mobile terminal 300, step S303 of receiving power information about the second mobile terminal 300, step S304 of obtaining power transmission and/or reception information, step S305 of determining a power transmitting and/or receiving condition, step S306 of transmitting and/or receiving power, step S307 of receiving data information about the second mobile terminal 300, step S308 of obtaining data transmission and/or reception information, step S309 of determining a data transmitting and/or receiving condition, and step S310 of transmitting and/or receiving data. However, all steps are not needed for an embodiment of the present invention, and some steps may be omitted. In an embodiment, another step may be added.

Referring to FIG. 3B, in step S301 of determining whether the cable is connected, the first mobile terminal 100-1 determines whether the cable is connected to the interface unit 160.

In an embodiment, when the cable is connected to the interface unit 160, the controller 180 may determine a connection state of the cable.

In another embodiment, the controller 180 may display the connection state of the cable on the display unit 151.

In another embodiment, the controller 180 may transmit the connection state of the cable to the second mobile terminal 300 connected thereto through the cable.

The connection state of the cable may include information about a kind of the cable.

The controller 180 may determine information about a time when the interface unit 160 is connected to the cable, based on the connection state of the cable.

Referring to FIG. 3B, in step S302 of receiving the cable connection information about the second mobile terminal 300, the first mobile terminal 100-1 may receive information about a cable connection state of the second mobile terminal 300 through the cable.

In an embodiment, the controller 180 of the first mobile terminal 100-1 may receive the cable connection information from the second mobile terminal 300.

The cable connection information may include information representing that the cable is connected to the second mobile terminal 300 and may include information about a time when the cable is connected to the second mobile terminal 300 and data capable of being transmitted from the second mobile terminal 300 to the first mobile terminal 100-1.

Referring to FIG. 3B, in step S303 of receiving the power information about the second mobile terminal 300, the first mobile terminal 100-1 may receive information about a power state of the second mobile terminal 300 through the cable.

In an embodiment, the controller 180 of the first mobile terminal 100-1 may receive, through the cable, information including information about power such as a voltage and a current of the second mobile terminal 300.

In another embodiment, the controller 180 of the first mobile terminal may receive, through the cable, information about a power transmitting and/or receiving condition of the second mobile terminal 300.

The power transmitting and/or receiving condition may include information whether power transmission is allowed and information about a condition of limiting power transmission.

In another embodiment, at least two of step S302 of receiving the cable connection information about the second mobile terminal 300, step S303 of receiving the power information about the second mobile terminal 300, and step S307 of receiving the data information about the second mobile terminal 300 may be simultaneously performed.

In another embodiment, when transmission and/or reception of power is not needed, the controller 180 may omit step S303 of receiving the power information about the second mobile terminal 300.

Referring to FIG. 3B, in step S304 of obtaining the power transmission and/or reception information, power transmission and/or reception information about the first mobile terminal 100-1 and power transmission and/or reception information about the second mobile terminal 300 may be obtained.

In an embodiment, the controller 180 of the first mobile terminal 100-1 may obtain the power transmission and/or reception information about the second mobile terminal 300 through step S302 of receiving the cable connection information about the second mobile terminal 300 and step S303 of receiving the power information about the second mobile terminal 300. Also, the controller 180 of the first mobile terminal 100-1 may obtain the power transmission and/or reception information about the first mobile terminal 100-1.

The power transmission and/or reception information may include a voltage and a current of each of the first mobile terminal 100-1 and the second mobile terminal 300 and a power state of the power supply unit.

In an embodiment, the controller 180 may receive information about a power transmitting and/or receiving condition from a user of the first mobile terminal 100-1.

The power transmitting and/or receiving condition may include information about whether power transmission is allowed and information about a condition of limiting power transmission.

Therefore, the controller 180 may obtain all of the power transmission and/or reception information and the power transmitting and/or receiving condition of each of the first mobile terminal 100-1 and the second mobile terminal 300.

The power supply unit may include a battery, and the battery may be an embedded battery or a replaceable battery.

The power state may be a power state of the battery and may include a remaining power of the battery by using an output voltage of the battery.

Referring to FIG. 3B, in step S305 of determining a power transmitting and/or receiving condition, whether power is transmitted or received between the first mobile terminal 100-1 and the second mobile terminal 300 may be determined.

In an embodiment, the controller 180 may determine the first mobile terminal 100-1 as a mobile terminal which supplies power.

In another embodiment, the controller 180 may determine the second mobile terminal 300 as a mobile terminal which supplies power.

In another embodiment, the controller 180 may control the first mobile terminal 100-1 and the second mobile terminal 300 not to transmit and/or receive power therebetween.

For example, the controller 180 of the first mobile terminal 100-1 may set one of the first mobile terminal 100-1 and the second mobile terminal 30 as a power supply mobile terminal, based on information obtained through step S304 of obtaining the power transmission and/or reception information and may allow the power supply mobile terminal to supply power to one other terminal. Also, the controller 180 may limit transmission and/or reception of power even when the first mobile terminal 100-1 and the second mobile terminal 300 are connected to the cable.

In an embodiment, the controller 180 may control a speed at which the first mobile terminal 100-1 and the second mobile terminal 300 transmit and/or receive power therebetween.

In another embodiment, the controller 180 may control the amount of power transmitted or received between the first mobile terminal 100-1 and the second mobile terminal 300.

In another embodiment, the controller 180 may set a power transmitting and/or receiving condition of the first mobile terminal 100-1 and the second mobile terminal 300 and may change a power transmission and/or reception mode including a power transmission and/or reception direction and a power transmission and/or reception speed, based on the set condition.

Referring to FIG. 3B, in step S306 of transmitting and/or receiving the power, the power may be transmitted or received between the first mobile terminal 100-1 and the second mobile terminal 300 through the cable.

In an embodiment, the controller 180 may control the first mobile terminal 100-1 to supply the power to the second mobile terminal 300 through the cable, based on the condition which is determined through step S305 of determining the power transmitting and/or receiving condition.

In another embodiment, the controller 180 may control the first mobile terminal 100-1 so as to be supplied with the power from the second mobile terminal 300 through the cable, based on the condition which is determined through step S306 of transmitting and/or receiving the power.

In another embodiment, the controller 180 may control the first mobile terminal 100-1 and the second mobile terminal 300 not to transmit and/or receive the power therebetween, based on the condition which is determined through step S306 of transmitting and/or receiving the power.

In an embodiment, when the condition determined through step S305 of determining the power transmitting and/or receiving condition is not satisfied, the controller 180 may stop transmission and/or reception of the power.

Referring to FIG. 3B, in step S307 of receiving the data information about the second mobile terminal 300, the first mobile terminal 100-1 may receive information about transmission and/or reception of data of the second mobile terminal 300 through the cable.

In an embodiment, the controller 180 of the first mobile terminal 100-1 may receive information about whether transmission and/or reception of the data of the second mobile terminal 300 is allowed.

In another embodiment, the controller 180 of the first mobile terminal 100-1 may receive information about a data transmission allowance file and folder of the first mobile terminal 300.

In another embodiment, at least two of step S302 of receiving the cable connection information about the second mobile terminal 300, step S303 of receiving the power information about the second mobile terminal 300, and step S307 of receiving the data information about the second mobile terminal 300 may be simultaneously performed.

In another embodiment, when transmission and/or reception of the data information is not needed, the controller 180 may omit step S307 of receiving the data information about the second mobile terminal 300.

Referring to FIG. 3B, in step S308 of obtaining the data transmission and/or reception information, power transmission and/or reception information about the first mobile terminal 100-1 and power transmission and/or reception information about the second mobile terminal 300 may be obtained.

In an embodiment, the controller 180 of the first mobile terminal 100-1 may obtain the power transmission and/or reception information about the second mobile terminal 300 through step S302 of receiving the cable connection information about the second mobile terminal 300 and step S307 of receiving the data information about the second mobile terminal 300. Also, the controller 180 of the first mobile terminal 100-1 may obtain the power transmission and/or reception information about the first mobile terminal 100-1.

The power transmission and/or reception information may be information about the allowance or not of data transmission and/or reception and a data transmission allowance folder and file of each of the first mobile terminal 100-1 and the second mobile terminal 300.

The controller 180 may receive data transmission and/or reception information from the user of the first mobile terminal 100-1.

Therefore, the controller 180 may obtain all of data transmission and/or reception information about the first mobile terminal 100-1 and data transmission and/or reception information about the second mobile terminal 300.

Referring to FIG. 3B, in step S309 of determining the data transmitting and/or receiving condition, whether data is transmitted or received between the first mobile terminal 100-1 and the second mobile terminal 300 may be determined.

In an embodiment, the controller 180 may determine the first mobile terminal 100-1 as a mobile terminal which transmits data.

In another embodiment, the controller 180 may determine the second mobile terminal 300 as a mobile terminal which transmits data.

In another embodiment, the controller 180 may control the first mobile terminal 100-1 and the second mobile terminal 300 as mobile terminals which transmit data.

For example, the controller 180 of the first mobile terminal 100-1 may set one of the first mobile terminal 100-1 and the second mobile terminal 30 as a data transmission mobile terminal, based on information obtained through step S308 of obtaining the data transmission and/or reception information and may allow the data transmission mobile terminal to supply power to one other terminal.

Moreover, the controller 180 may set the first mobile terminal 100-1 and the second mobile terminal 300 as data transmission terminals in a certain case.

Moreover, the controller 180 may limit transmission and/or reception of data even when the first mobile terminal 100-1 and the second mobile terminal 300 are connected to the cable.

In an embodiment, the controller 180 may control a speed at which the first mobile terminal 100-1 and the second mobile terminal 300 transmit and/or receive data therebetween.

In another embodiment, the controller 180 may set a data transmitting and/or receiving condition of the first mobile terminal 100-1 and the second mobile terminal 300 and may change a data transmission and/or reception mode including a data transmission and/or reception direction and a data transmission and/or reception speed, based on the set condition.

Referring to FIG. 3B, in step S310 of transmitting and/or receiving the data, the data may be transmitted or received between the first mobile terminal 100-1 and the second mobile terminal 300 through the cable.

In an embodiment, the controller 180 may control the first mobile terminal 100-1 to transmit data to the second mobile terminal 300 through the cable, based on the condition which is determined through step S309 of determining the data transmitting and/or receiving condition.

In another embodiment, the controller 180 may control the first mobile terminal 100-1 so as to receive data from the second mobile terminal 300 through the cable, based on the condition which is determined through step S309 of determining the data transmitting and/or receiving condition.

In another embodiment, the controller 180 may control the first mobile terminal 100-1 and the second mobile terminal 300 to transmit and/or receive data therebetween, based on the condition which is determined through step S309 of determining the data transmitting and/or receiving condition.

In another embodiment, the controller 180 may control the first mobile terminal 100-1 and the second mobile terminal 300 not to transmit and/or receive data therebetween, based on the condition which is determined through step S309 of determining the data transmitting and/or receiving condition.

In an embodiment, when the first mobile terminal 100-1 receives data from the second mobile terminal 300, the controller 180 may obtain data information including information about a transmission allowance folder and file of the second mobile terminal 300 and may select and receive some of allowed files and folders.

Hereinafter, detailed embodiments of step S301 of determining whether the cable is connected, step S302 of receiving the cable connection information about the second mobile terminal 300, step S303 of receiving the power information about the second mobile terminal 300, step S304 of obtaining the power transmission and/or reception information, step S305 of determining the power transmitting and/or receiving condition, step S306 of transmitting and/or receiving the power, step S307 of receiving the data information about the second mobile terminal 300, step S308 of obtaining the data transmission and/or reception information, step S309 of determining the data transmitting and/or receiving condition, and step S310 of transmitting and/or receiving the data will be described.

Figure 4A:
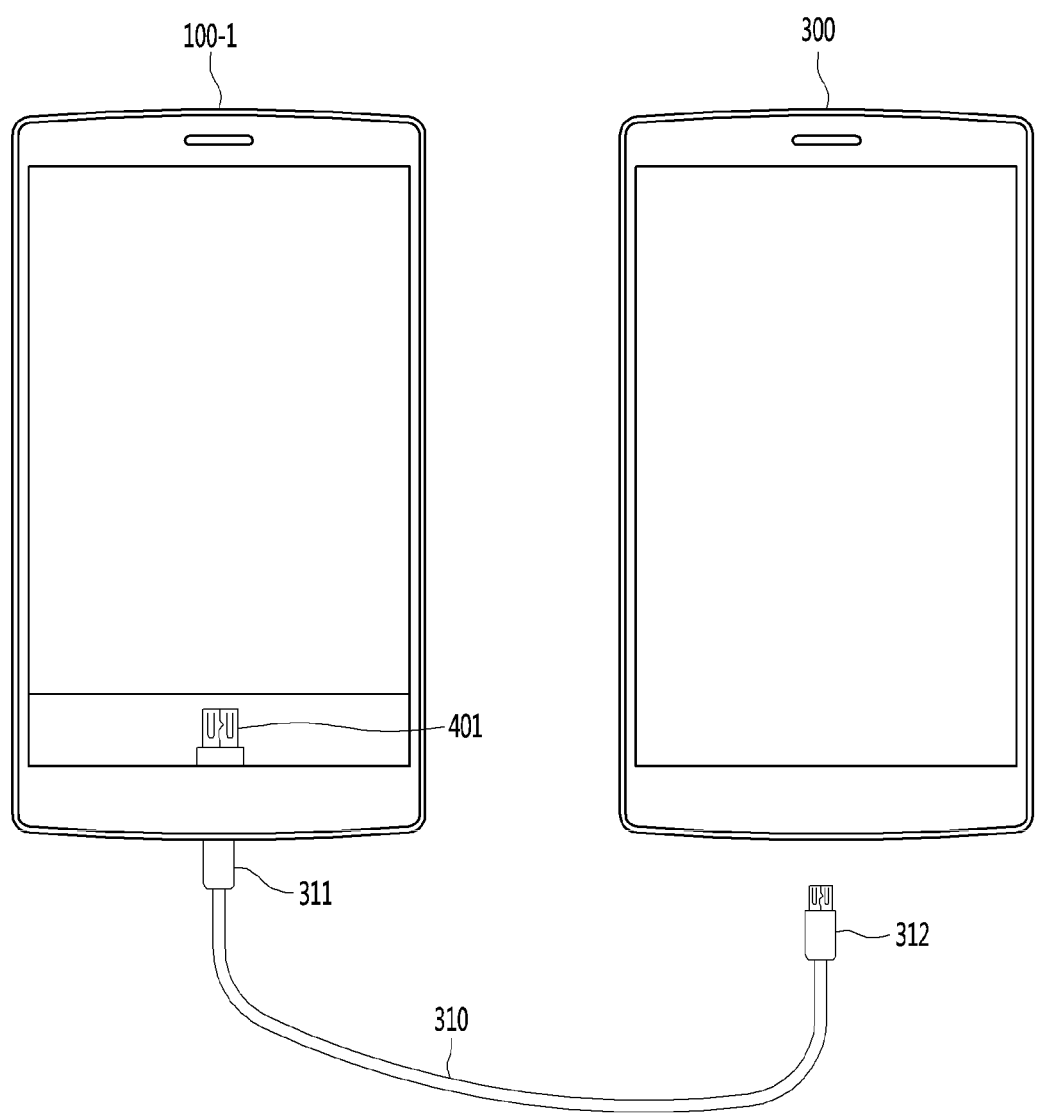
FIGS. 4A and 4B are diagrams for describing power transmission and/or reception between a plurality of mobile terminals connected to a cable, associated with another embodiment of the present invention.
Figure 4B:
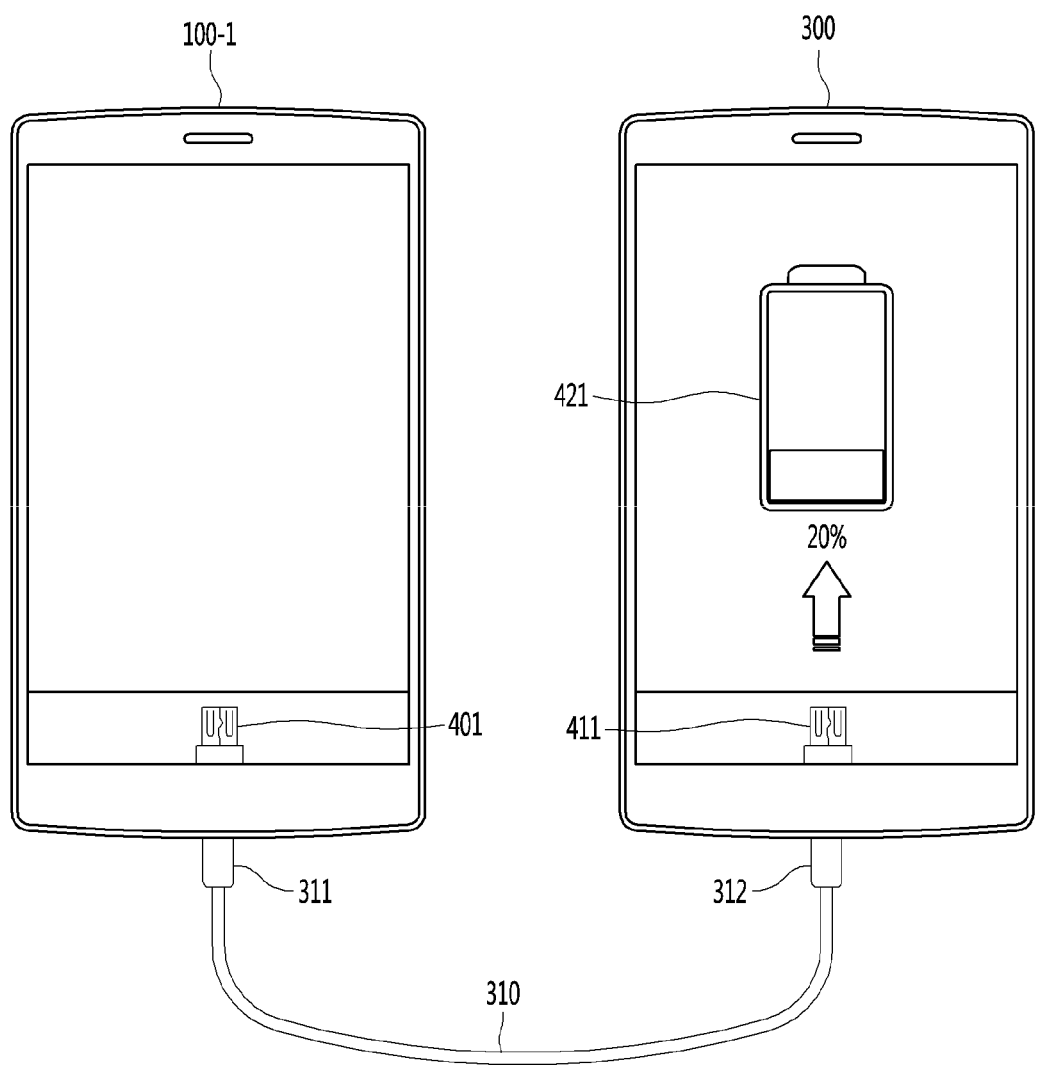

FIGS. 4A and 4B are diagrams for describing power transmission and/or reception between a plurality of mobile terminals connected to a cable, associated with another embodiment of the present invention.

Referring to FIG. 4A, the plurality of mobile terminals connected to the cable associated with another embodiment of the present invention may include a first mobile terminal 100-1, a second mobile terminal 300, and a cable, and even when the cable is connected to the first mobile terminal 100-1 in a state where the cable is not connected to the second mobile terminal 300, the first mobile terminal 100-1 may determine the connection or not of the cable.

For example, the controller 180 of the first mobile terminal 100-1 may recognize when the cable is connected to the interface unit 160. Even in a state where the cable is not connected to the second mobile terminal 300 as in FIG. 4A, the controller 180 may recognize the cable. When a connector of the cable is connected to the interface unit 160, the controller 180 may display information 401, representing that the cable is connected to the interface unit 160, on the display unit 151.

As another example, when the connector of the cable is connected to the interface unit 160, the controller 180 may allow the display unit 151 to display the information 401 representing that the cable is connected to a region adjacent to the interface unit 160.

As another example, when the cable is connected to the interface unit 160, the controller 180 may allow the display unit 151 to display information about a state of the connected cable. The information about the state of the cable may include information about a kind of the cable and a connected mobile terminal. For example, when a cable of a USB C type is connected to the interface unit 160, the display unit 151 may display the information representing that the cable of the USB C type is connected to the interface unit 160. As another example, when the interface unit 160 is a USB C type but a cable of a USB B type is connected to the interface unit 160 through a conversion terminal, the controller 180 may allow the display unit 151 to display the information 401 representing that a cable having a connector shape of the USB B type cable is connected to the interface unit 160. As another example, when a cable connected to the interface unit 160 is connected to another mobile terminal and when not connected to the other mobile terminal, the controller 180 may allow the display unit 151 to display information obtained by changing the information representing that the cable is connected. An operation of allowing the display unit 151 to display information obtained by changing the information representing that the cable is connected may change a color, a shape, and a size of the information 401 representing that the cable is connected, or may variously change like adding a new text.

As another example, the controller 180 may display the information 401, representing that the cable is connected, on the display unit 151 only for a certain time after the cable is connected. The certain time may be a predetermined time, and a time for which the information 401 representing that the cable is connected is displayed may vary based on a state of the connected cable.

Referring to FIG. 4B, when the first mobile terminal 100-1 is connected to the second mobile terminal 300 through the cable, the controller 180 may allow the display unit 151 to display a state where the cable is connected.

For example, when the first mobile terminal 100-1 is connected to the second mobile terminal 300 through the cable, the controller 180 of the first mobile terminal 100-1 may receive cable connection information from the second mobile terminal 300, and the controller of the second mobile terminal 300 may receive the cable connection information from the first mobile terminal 100-1, whereby the first mobile terminal 100-1 and the second mobile terminal 300 may display the information 401 and information 411, each representing that the cable is connected, on the display unit 151.

As another example, when the first mobile terminal 100-1 is connected to the second mobile terminal 300 through the cable, the controller 180 of the first mobile terminal 100-1 may receive cable connection information from the second mobile terminal 300 and may receive, through the cable, power such as a voltage and a current of the second mobile terminal 300. Also, the controller 180 of the first mobile terminal 100-1 may obtain power transmission and/or reception information about the first mobile terminal 100-1. Therefore, the controller 180 may determine, as a mobile terminal, a mobile terminal which battery power is higher, and when power of a battery of the first mobile terminal 100-1 is higher, the controller 180 may control the first mobile terminal 100-1 to supply power to the second mobile terminal 300 through the cable. For example, when the first mobile terminal 100-1 is connected to the second mobile terminal 300, the first mobile terminal 100-1 may receive information representing that 20% of power of a battery of the second mobile terminal 300 remains. Also, the first mobile terminal 100-1 may obtain information representing that power of the first mobile terminal 100-1 is 20% higher. Therefore, the controller 180 of the first mobile terminal 100-1 may designate the first mobile terminal 100-1 as a power supply terminal. Therefore, the controller 180 of the first mobile terminal 100-1 may control the first mobile terminal 100-1 to supply power to the second mobile terminal 300 through the cable. The controller of the second mobile terminal 300 may allow the display unit 151 to display a remaining power of the battery 421 and information notifying that the battery is being charged.

Therefore, a mobile terminal, where power of a battery is higher, of the first mobile terminal 100-1 and the second mobile terminal 300 may be designated as a power supply mobile terminal, thereby obtaining an effect where a mobile terminal where power of a battery is insufficient is easily charged.

As another example, when the first mobile terminal 100-1 and the second mobile terminal 300 are connected to the cable, the controller 180 of the first mobile terminal 100-1 may receive cable connection information from the second mobile terminal 300. Therefore, the controller 180 may designate, as a power supply terminal, a terminal which is first connected to the cable. When the first mobile terminal 100-1 is first connected to the cable, the controller 180 may control the first mobile terminal 100-1 to supply power to the second mobile terminal 300 through the cable. For example, when the first mobile terminal 100-1 is connected to the cable and then the second mobile terminal 300 is connected to the cable, the controller 180 of the first mobile terminal 100-1 may designate the first mobile terminal 100-1 as a power supply terminal. Therefore, the controller 180 of the first mobile terminal 100-1 may control the first mobile terminal 100-1 to supply power to the second mobile terminal 300 through the cable. The controller of the second mobile terminal 300 may allow the display unit 151 to display a remaining power of the battery and information notifying that the battery is being charged.

Therefore, a mobile terminal which is first connected to a cable may be designated as a power supply terminal, thereby obtaining an effect where a user easily designates a power supply terminal.

Figure 5B:
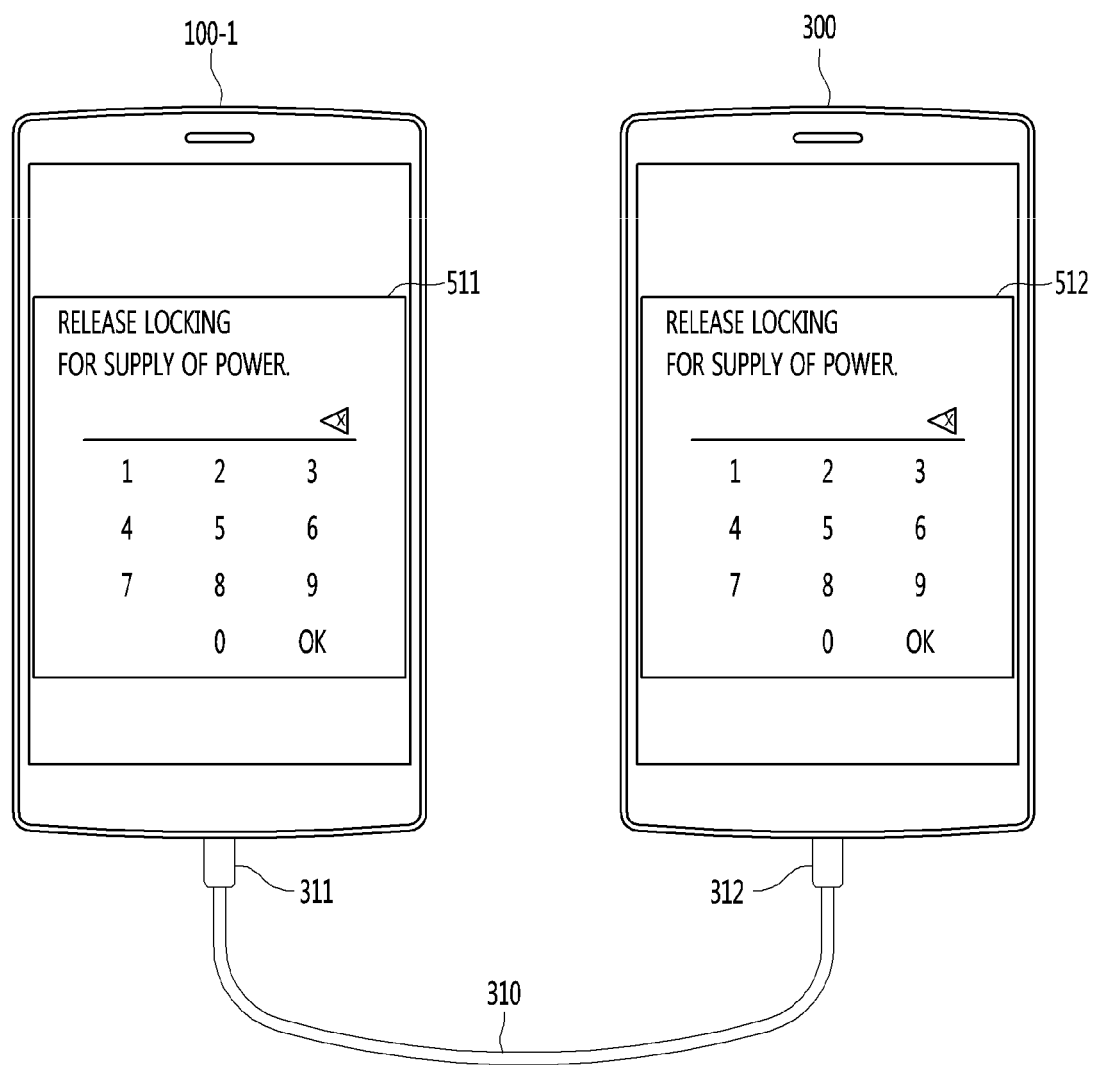

FIGS. 5A and 5B are diagrams for describing power transmission and/or reception between a plurality of mobile terminals connected to a cable, associated with another embodiment of the present invention.

Referring to FIG. 5A, when the first mobile terminal 100-1 is determined as a mobile terminal which supplies power, the controller 180 may designate unlocking of the first mobile terminal 100-1 as an additional condition for supplying the power.

For example, when the first mobile terminal 100-1 is connected to the second mobile terminal 300 through the cable, the controller 180 of the first mobile terminal 100-1 may receive cable connection information from the second mobile terminal 300 and may receive, through the cable, information including information about power such as a voltage and a current of the second mobile terminal 300. Also, the controller 180 of the first mobile terminal 100-1 may obtain power transmission and/or reception information about the first mobile terminal 100-1. Therefore, the controller 180 may determine a power transmitting and/or receiving condition and may designate the first mobile terminal 100-1 as a power transmission terminal or a power reception terminal. When the first mobile terminal 100-1 is designated as a power transmission (supply) terminal and the first mobile terminal 100-1 is in a lock state, the first mobile terminal 100-1 may display an unlock screen 501 on the display unit 151. Only when locking is released, the controller 180 may control the first mobile terminal 100-1 to supply power to the second mobile terminal 300 through the cable. Unlocking may be performed in various methods such as code input, fingerprint recognition, and iris recognition, and the method is not limited. The second mobile terminal 300 may display information 511 representing that the cable is connected, on the display unit 151.

Therefore, the power of the first mobile terminal 100-1 may be prevented from being transmitted to the second mobile terminal 300 without approval of the first mobile terminal 100-1, thereby obtaining an effect for blocking transmission of power irrelevant to an intention of a user.

Referring to FIG. 5B, when the first mobile terminal 100-1 is connected to the second mobile terminal 300 through the cable, the controller 180 of the first mobile terminal 100-1 may receive the cable connection information from the second mobile terminal 300. Also, when the first mobile terminal 100-1 is connected to the second mobile terminal 300 through the cable, the first mobile terminal 100-1 may display a lock state 511 on the display unit 151 thereof, the second mobile terminal 300 may display a lock state 512 on the display unit 151 thereof, and a terminal, which is first unlocked, of the first mobile terminal 100-1 and the second mobile terminal 300 may be designated as a power supply terminal.

Therefore, an effect for blocking transmission of power irrelevant to an intention of a user may be obtained. Also, since a first-unlocked mobile terminal is designated as a power supply terminal, an effect for enabling the user to easily designate the power supply terminal may be obtained.

As another example, when the first mobile terminal 100-1 is connected to the second mobile terminal 300 through the cable, the controller 180 of the first mobile terminal 100-1 may receive the cable connection information from the second mobile terminal 300 and may receive, through the cable, the information including the information about the power such as the voltage and the current of the second mobile terminal 300. Also, the controller 180 of the first mobile terminal 100-1 may obtain the power transmission and/or reception information about the first mobile terminal 100-1. Therefore, the controller 180 may check a power state of each of the first mobile terminal 100-1 and the second mobile terminal 300. When the first mobile terminal 100-1 is connected to the second mobile terminal 300 through the cable, the display unit of the first mobile terminal 100-1 may display the lock state 511, the display unit of the second mobile terminal 300 may display the lock state 512, the display unit of the first mobile terminal 100-1 may display (not shown) a power state of the first mobile terminal 100-1, and the display unit of the second mobile terminal 300 may display (not shown) a power state of the second mobile terminal 300. Also, a terminal, which is first unlocked, of the first mobile terminal 100-1 and the second mobile terminal 300 may be designated as a power supply terminal.

Therefore, an effect for blocking transmission of power irrelevant to an intention of a user may be obtained, and a user of a mobile terminal may easily check the power states of first mobile terminal 100-1 and the second mobile terminal 300. Also, since a first-unlocked mobile terminal is designated as a power supply terminal, an effect for enabling the user to easily designate the power supply terminal may be obtained.

Figure 6:
FIG. 6 is a diagram for describing a method of displaying a power supplying state when power is being transmitted or received between a plurality of mobile terminals connected to a cable, associated with another embodiment of the present invention.

FIG. 6 is a diagram for describing a method of displaying a power supplying state when power is being transmitted or received between a plurality of mobile terminals connected to a cable, associated with another embodiment of the present invention.

Referring to FIG. 6, a notification "power is being supplied" may be displayed by a terminal which is being supplied with the power.

For example, when the first mobile terminal 100-1 is connected to the second mobile terminal 300 through the cable and the first mobile terminal 100-1 supplies power to the second mobile terminal 300, the controller 180 may allow the display unit 151 to display a notification 601 indicating "power is being supplied". Also, when the user of the first mobile terminal 100-1 inputs, through the display unit 151, a gesture which selects the notification 601 indicating "power is being supplied", the controller 180 may allow the display unit 151 to display a screen (not shown) for changing a power supplying condition.

Therefore, the user of the first mobile terminal 100-1 may check a state where power is supplied to the second mobile terminal 300, thereby obtaining an effect for preventing power from being supplied to the second mobile terminal 300 regardless of an intention of the user.

Figure 7A:
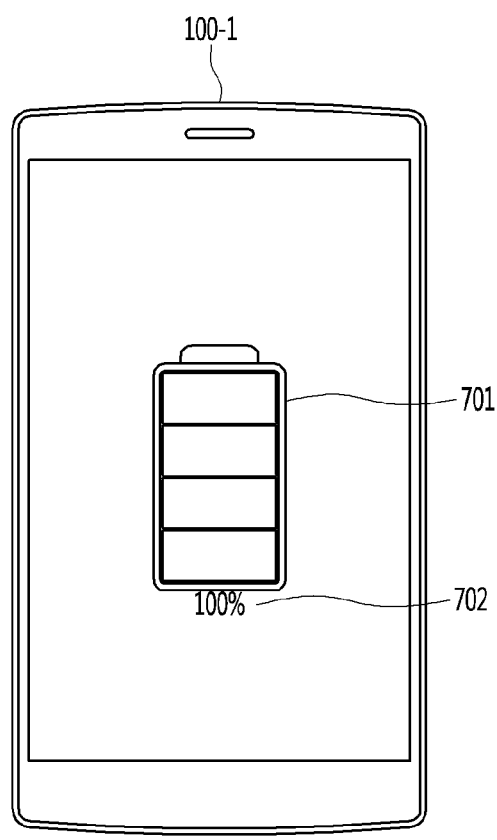
FIGS. 7A to 7C are diagrams for describing power transmission and/or reception between a plurality of mobile terminals connected to a cable, associated with another embodiment of the present invention.
Figure 7B:
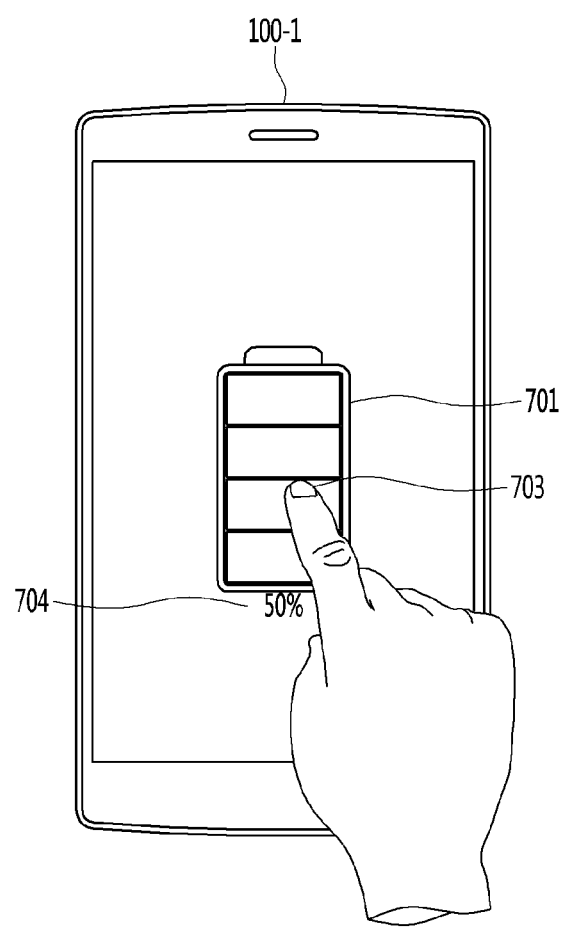
Figure 7C:
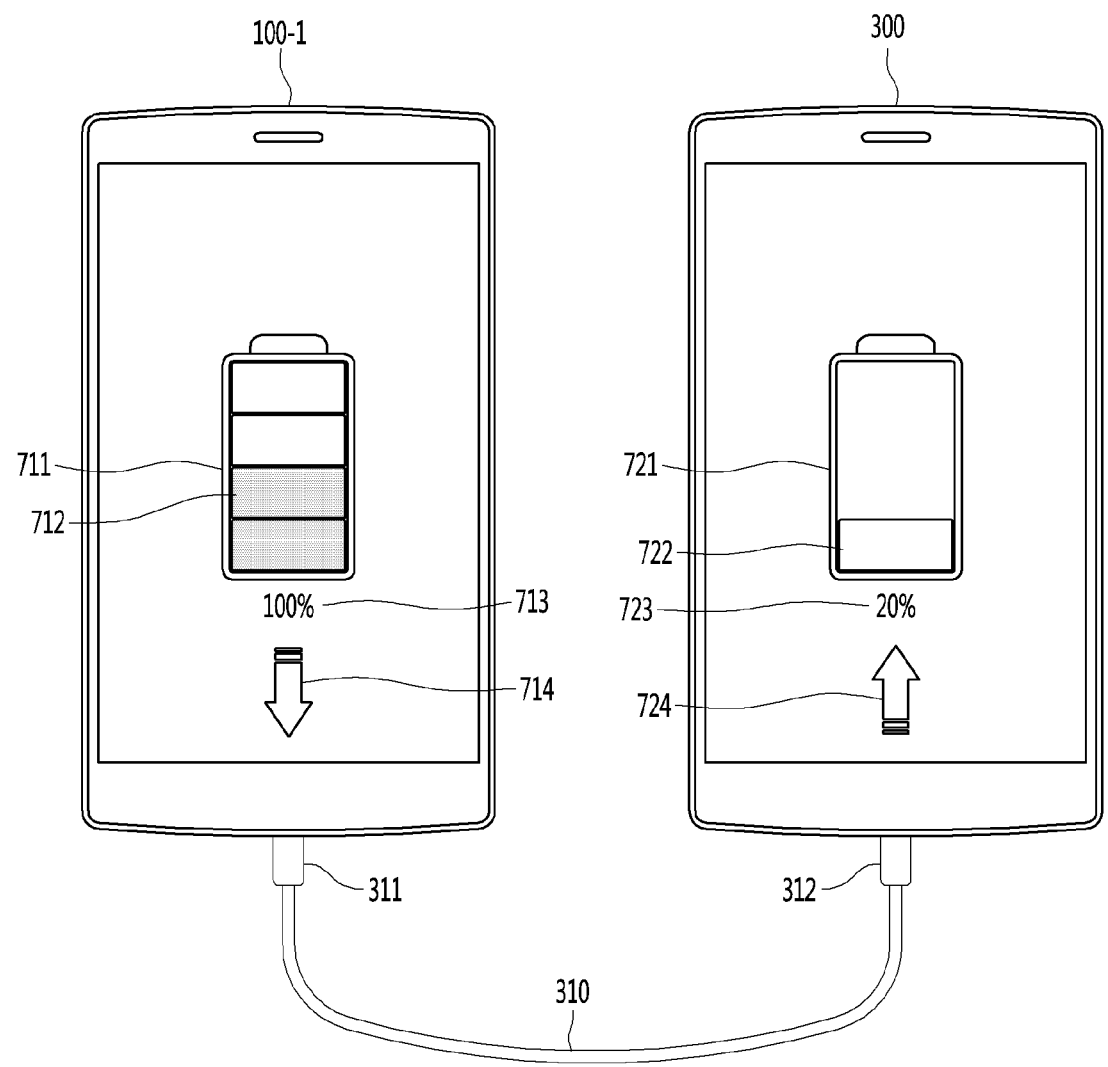

FIGS. 7A to 7C are diagrams for describing power transmission and/or reception between a plurality of mobile terminals connected to a cable, associated with another embodiment of the present invention.

Referring to FIGS. 7A and 7B, the user of the first mobile terminal 100-1 may set a limitation of battery power capable of supply.

The controller 180 of the first mobile terminal 100-1 may set a power transmitting and/or receiving condition of each of the first mobile terminal 100-1 and the second mobile terminal 300 and may change a data transmission and/or reception mode including a data transmission and/or reception direction and a data transmission and/or reception speed, based on the set condition.

In an embodiment, the controller 180 may control the amount of power transmitted and/or received between the first mobile terminal 100-1 and the second mobile terminal 300.

For example, the controller 180 of the first mobile terminal 100-1 may allow the display unit 151 to display a screen controlling a supply limitation power setting mode for setting the power transmitting and/or receiving condition. In detail, in the supply limitation power setting mode, the display unit 151 may display a current state of a battery as an image 701 or a character 702. Also, a limitation of power transmission may be set. For example, when battery power of the first mobile terminal 100-1 is 100%, the controller 180 may allow the display unit 151 to display a state of the battery as the image 701 or the character 702. Also, when a user of a mobile terminal selects (703) a limitation of battery supply power in the image 701 displayed by the display unit 151, the display unit 151 may display a selected numerical value 704, and the controller 180 may supply power, corresponding to the selected limitation of the battery supply power, to the second mobile terminal 300.

Referring to FIG. 7C, the first mobile terminal 100-1 may supply power to the second mobile terminal 300 under a limited condition.

In a state where the first mobile terminal 100-1 is connected to the second mobile terminal 300 through the cable and the controller 180 of the first mobile terminal 100-1 designates the first mobile terminal 100-1 as a power supply mobile terminal, when a power limitation condition is set in the first mobile terminal 100-1, the first mobile terminal 100-1 may supply the power to the second mobile terminal 300 under the power limitation condition.

For example, in a state where a limitation of power transmission is set as in FIG. 7B, when the first mobile terminal 100-1 is connected to the second mobile terminal 300 through the cable and the first mobile terminal 100-1 is designated as a power supply terminal, the controller 180 of the first mobile terminal 100-1 may allow the display unit 151 to display a current battery power amount 711, a power amount 712 where power supply is limited and a character 713 indicating the power amount. Also, the controller 180 may supply power to the second mobile terminal 300 until power of the battery of the first mobile terminal 100-1 reaches the power amount 712 where power supply is limited.

When a power amount of the battery of the second mobile terminal 300 is 100% or a power amount of the battery of the first mobile terminal 100-1 reaches the power amount 712 where power supply is limited, the controller 180 may limit the supply of power to the second mobile terminal 300.

Therefore, the user of the first mobile terminal 100-1 may set the power amount 712 where power supply is limited, thereby obtaining an effect of safely securing power for an operation of the first mobile terminal 100-1.

As another example, the user of the first mobile terminal 100-1 may set a speed at which the first mobile terminal 100-1 supplies power to the second mobile terminal 300. A speed at which power is supplied may be a level of a current, transferred from the first mobile terminal 100-1 to the second mobile terminal 300, per unit time.

As another example, the user of the second mobile terminal 300 may set a speed at which the second mobile terminal 300 is supplied with power from the first mobile terminal 100-1.

As another example, in a case where the user of the first mobile terminal 100-1 sets a speed at which the first mobile terminal 100-1 supplies power to the second mobile terminal 300 and sets a speed at which the second mobile terminal 300 is supplied with the power from the first mobile terminal 100-1, the user of the first mobile terminal 100-1 may set the speed, at which the first mobile terminal 100-1 supplies the power to the second mobile terminal 300, to a lower speed of the speed at which the first mobile terminal 100-1 supplies the power to the second mobile terminal 300 and the speed at which the second mobile terminal 300 is supplied with the power from the first mobile terminal 100-1.

As another example, it is assumed that the first mobile terminal 100-1 is connected to the second mobile terminal 300 through the cable and the first mobile terminal 100-1 is determined as a mobile terminal which supplies power. When locking of the first mobile terminal 100-1 is not released, the controller 180 of the first mobile terminal 100-1 may control the first mobile terminal 100-1 to continuously supply the power. Also, when locking of the first mobile terminal 100-1 is released, the controller 180 of the first mobile terminal 100-1 may control the first mobile terminal 100-1 to supply the power at a high speed. For example, in a case where power is supplied at a high speed, power of 100 W may be transmitted, and in a case where power is supplied at a low speed, power of 50 W may be transmitted. Also, a speed at which power is transmitted may be arbitrarily changed.

As another example, when the first mobile terminal 100-1 is connected to the second mobile terminal 300 through the cable and the first mobile terminal 100-1 is designated as a power supply terminal, the controller 180 of the first mobile terminal 100-1 may allow the display unit 151 to display a speed 714 of power supplied from the first mobile terminal 100-1 to the second mobile terminal 300. Also, the controller of the second mobile terminal 300 may allow the display unit thereof to display a speed 724 of power with which the second mobile terminal 300 is supplied from the first mobile terminal 100-1, a current battery power amount 721, a power amount 722 and a character 723 indicating the power amount.

Therefore, a user of a mobile terminal may adjust a power supply speed, and thus, when an operation and charging of the mobile terminal are simultaneously performed, overheating of the mobile terminal may be prevented. Also, since overheating of the mobile terminal is prevented, an effect of preventing power from being lost by heat may be obtained. Also, the power of the battery of the first mobile terminal 100-1 may be prevented from being consumed at a high speed regardless of an intention of the user.

FIGS. 8A to 8E are diagrams for describing power transmission and/or reception between a plurality of mobile terminals connected to a cable, associated with an embodiment of the present invention.

Figure 8A:
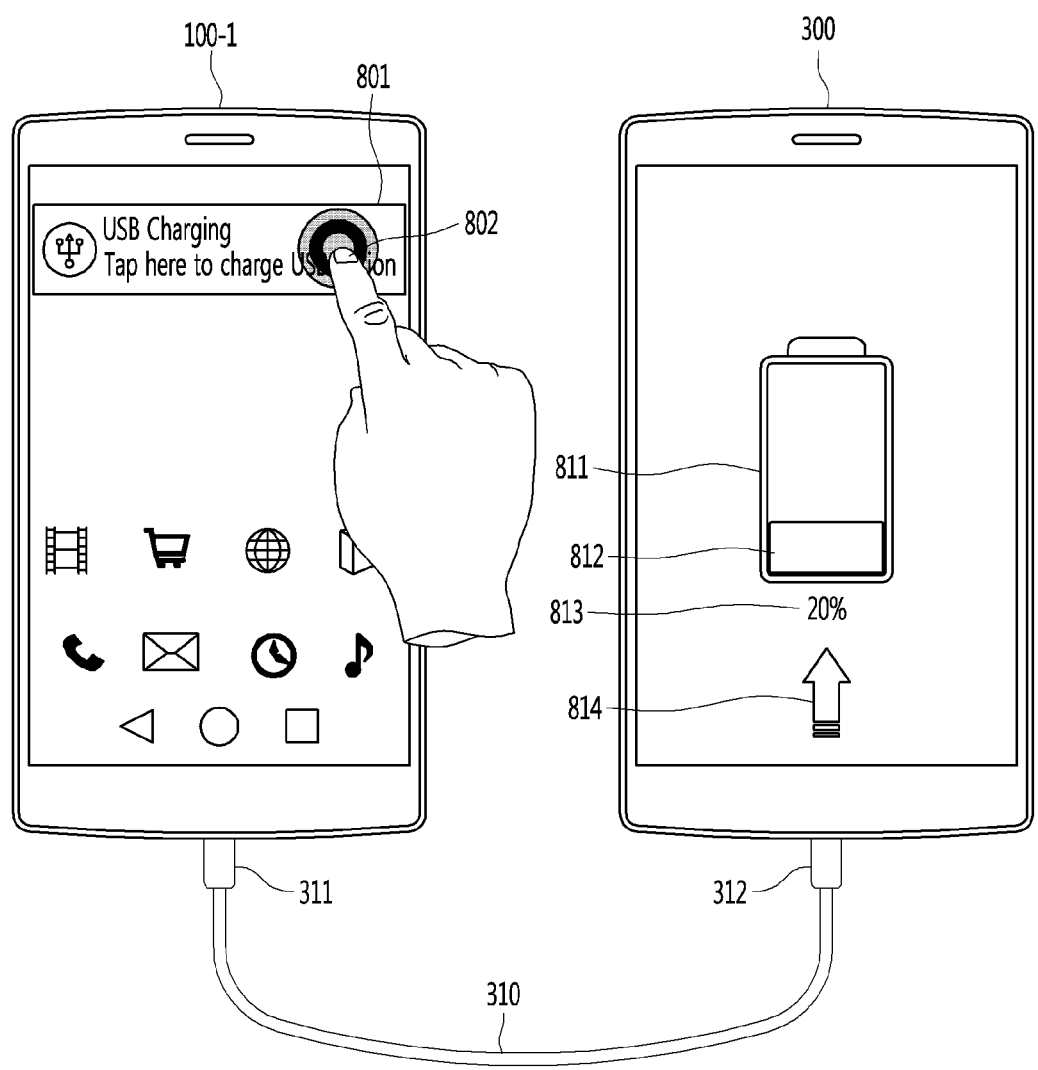
FIGS. 8A to 8E are diagrams for describing power transmission and/or reception between a plurality of mobile terminals connected to a cable, associated with an embodiment of the present invention.
Figure 8B:
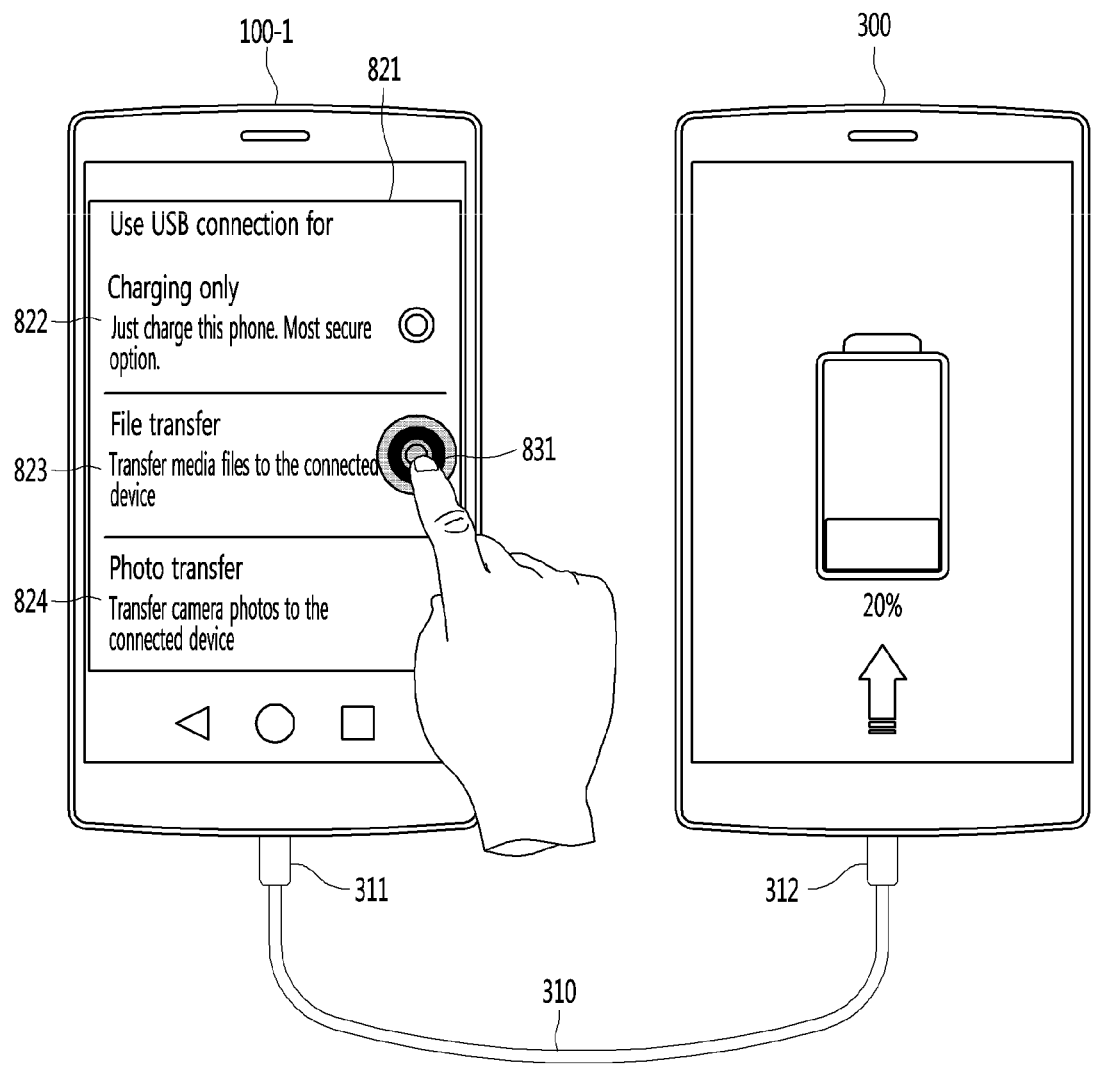

Referring to FIGS. 8A and 8B, the controller 180 of the first mobile terminal 100-1 may set transmission and/or reception states of power and data of the first mobile terminal 100-1 and the second mobile terminal 300.

For example, in a case where the first mobile terminal 100-1 is connected to the second mobile terminal 300 through the cable and the first mobile terminal 100-1 and the second mobile terminal 300 transmit and/or receive power or data therebetween, the controller 180 may allow the display unit 151 to display a transmission and/or reception state notification 801 of the power or the data. Also, when the user of the first mobile terminal 100-1 inputs a gesture 802 which selects the state notification 801, the controller 180 may allow the display unit 151 to display a screen 821 for changing the transmission and/or reception state of the power or the data. A current battery power amount 811, a power amount 812, a character 813 indicating the power amount, and a speed 814 are also displayed.

The screen 821 for changing the transmission and/or reception state of the power or the data may display a power supply dedicated mode 822, a file transmission mode 823, and a photograph transmission mode 824.

The power supply dedicated mode 822 denotes a mode where the first mobile terminal 100-1 and the second mobile terminal 300 may transmit and/or receive the power therebetween.

The file transmission mode 823 denotes a mode where the first mobile terminal 100-1 and the second mobile terminal 300 may transmit and/or receive the data therebetween.

The power supply dedicated mode 822 and the file transmission mode 823 are individually displayed, but may be provided as a mode where power supply or file transmission may be simultaneously performed.

The photograph transmission mode 824 denotes a mode where the first mobile terminal 100-1 and the second mobile terminal 300 may transmit and/or receive the data therebetween, and particularly, may transmit and/or receive only a photograph in the data. The present invention classifies the photograph transmission mode 824 as a lower mode of data transmission and displays the photograph transmission mode 824, but may provide a mode for selecting various lower classifications such as a video file, an execution file, and a music file.

When each mode is selected, the controller 180 of the first mobile terminal 100-1 performs control to perform an operation corresponding thereto.

Therefore, an effect where the user of the first mobile terminal 100-1 may easily select transmission and/or reception of the power and the data may be obtained.

Figure 8C:
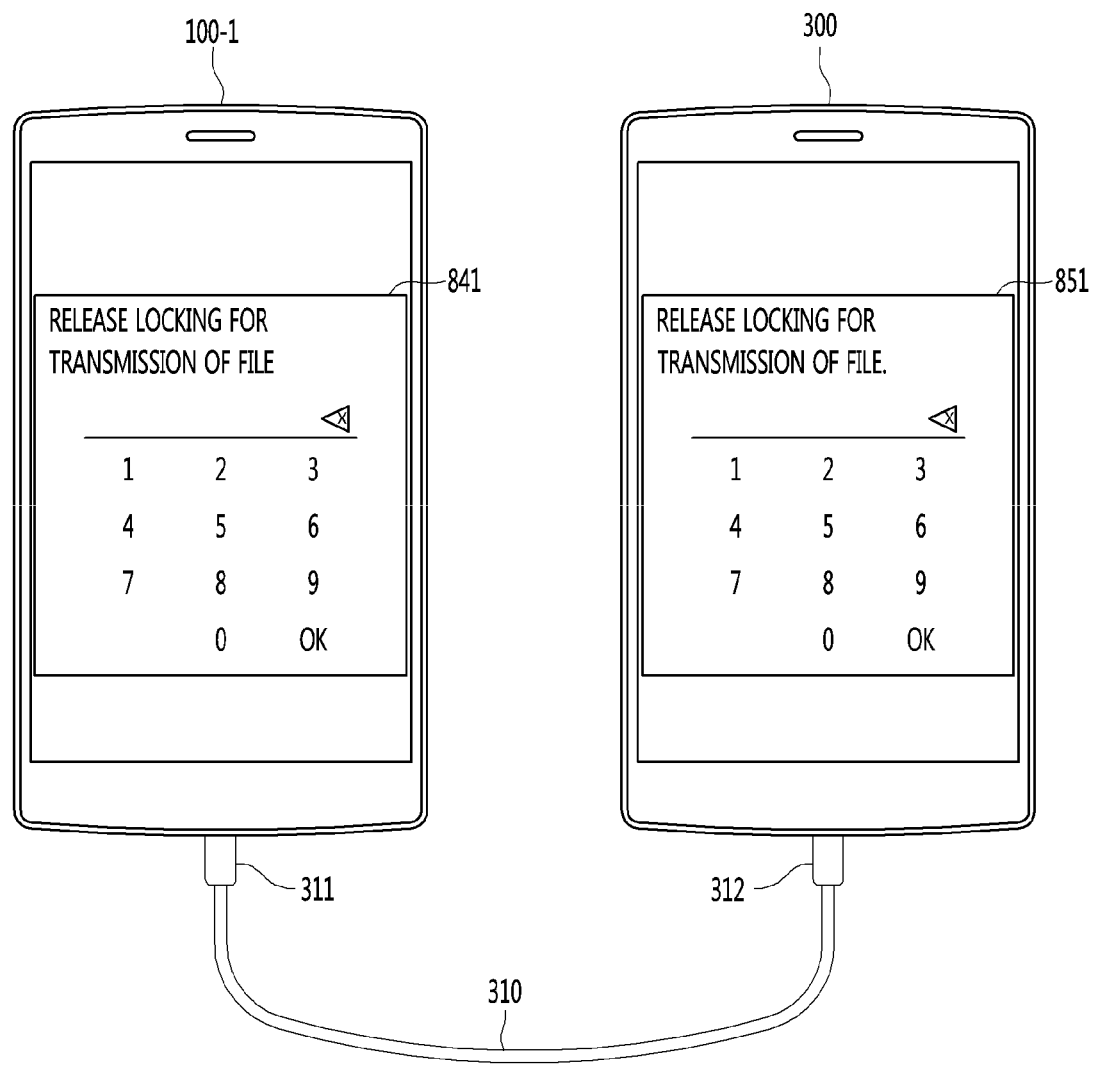

Referring to FIG. 8C, when the first mobile terminal 100-1 is connected to the second mobile terminal 300 through the cable, whether data transmission of each of the first mobile terminal 100-1 and the second mobile terminal 300 is allowed may be input to the controller 180.

For example, when the first mobile terminal 100-1 is connected to the second mobile terminal 300 through the cable, the controller 180 of the first mobile terminal 100-1 may receive cable connection information from the second mobile terminal 300 and may receive, through the cable, information including data transmission and/or reception information about the second mobile terminal 300. Also, the controller 180 of the first mobile terminal 100-1 may receive data transmission and/or reception information from the user of the first mobile terminal 100-1, and thus, may obtain data transmission and/or reception information about the first mobile terminal 100-1. Therefore, the controller 180 may determine a data transmitting and/or receiving condition, and in an embodiment, the controller 180 may determine the first mobile terminal 100-1 as a mobile terminal which transmits data. Also, in another embodiment, the controller 180 may determine the second mobile terminal 300 as a mobile terminal which transmits data. Also, in another embodiment, the controller 180 may determine the first mobile terminal 100-1 and the second mobile terminal 300 as mobile terminals which transmit data. Also, in another embodiment, the controller 180 may control the first mobile terminal 100-1 and the second mobile terminal 300 not to transmit and/or receive data therebetween.

Moreover, the allowance or not of data transmission may be input to the controller 180 of the first mobile terminal 100-1. The allowance or not of data transmission may be a gesture of the user input to the first mobile terminal 100-1, and in detail, may be an unlocking gesture. That is, when the first mobile terminal 100-1 is determined as a mobile terminal which supplies data, the controller 180 may designate unlocking of the first mobile terminal 100-1 as an additional condition for transmitting the data. Only when locking is released, the controller 180 may control the first mobile terminal 100-1 to transmit the data to the second mobile terminal 300 through the cable.

Transmission and/or reception of data may be simultaneously performed by the first mobile terminal 100-1 and the second mobile terminal 300. Therefore, only when locking is released, the controller of the second mobile terminal 300 may control the second mobile terminal 300 to transmit data to the first mobile terminal 100-1 through the cable. As described above, unlocking may be performed in various methods such as code input, fingerprint recognition, and iris recognition, and the method is not limited. Unlocking screens 841 and 851 are shown in FIG. 8C.

Therefore, the data of the first mobile terminal 100-1 may be prevented from being transmitted to the second mobile terminal 300 without approval of the first mobile terminal 100-1, thereby obtaining an effect for blocking transmission of data irrelevant to an intention of a user.

Figure 8D:
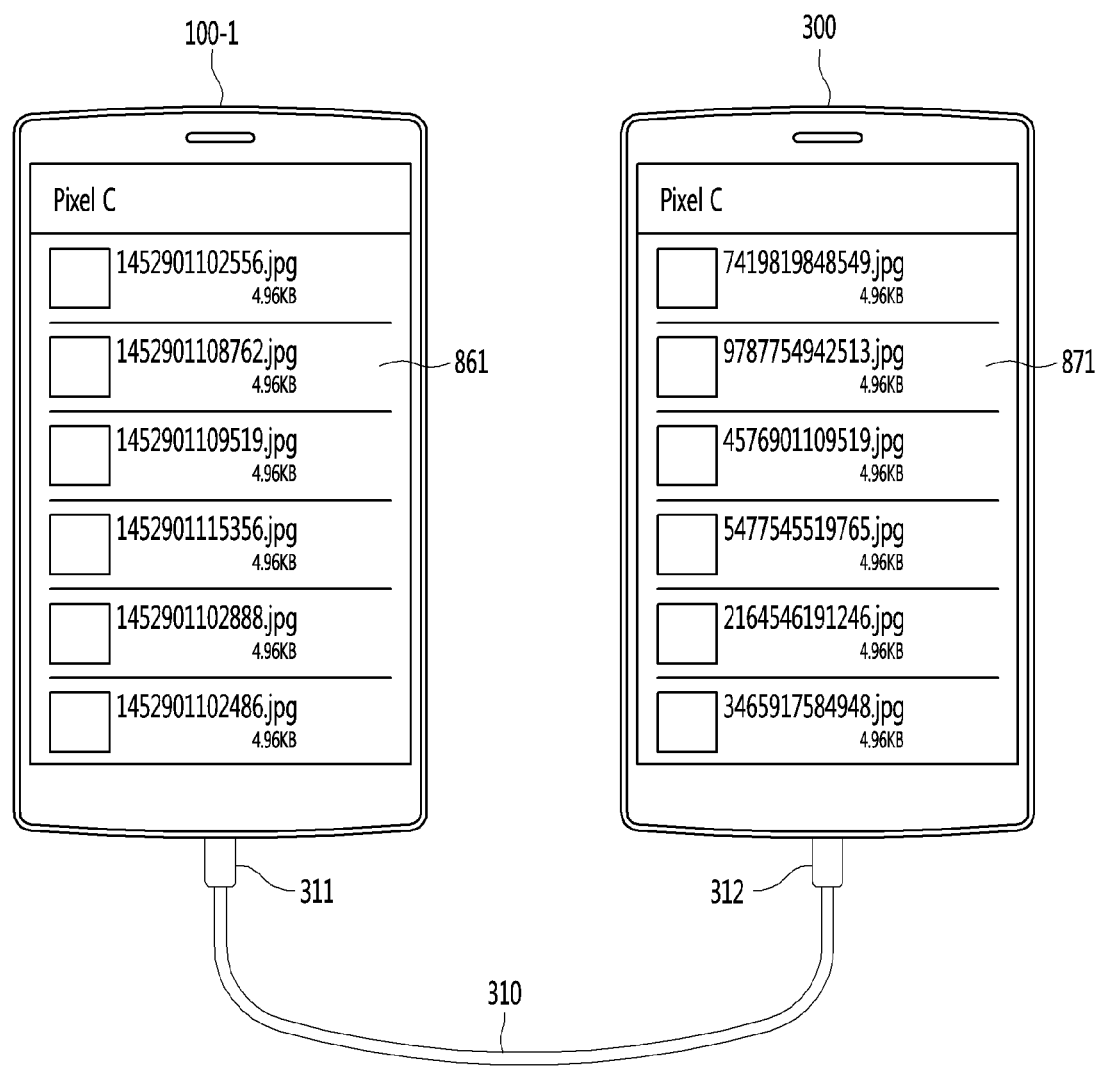

Referring to FIG. 8D, in a state where the first mobile terminal 100-1 is connected to the second mobile terminal 300 through the cable, when the second mobile terminal 300 allows transmission of data, the first mobile terminal 100-1 may check a data state of the second mobile terminal 300 and may select data which is to be transmitted.

For example, when the first mobile terminal 100-1 is connected to the second mobile terminal 300 through the cable, the controller 180 of the first mobile terminal 100-1 may receive cable connection information from the second mobile terminal 300 and may receive, through the cable, information including data transmission and/or reception information about the second mobile terminal 300. The data transmission and/or reception information about the second mobile terminal 300 may include information about a file capable of being transmitted from the second mobile terminal 300 to the first mobile terminal 100-1. The information about the file capable of being transmitted from the second mobile terminal 300 to the first mobile terminal 100-1 may be included in the data transmission and/or reception information only when the second mobile terminal allows transmission of data to the first mobile terminal 100-1.

Moreover, the first mobile terminal 100-1 may display information 861 about a file, which is capable of being transmitted from the second mobile terminal 300 to the first mobile terminal 100-1, on the display unit 151 of the first mobile terminal 100-1 as in FIG. 8D. Also, the user of the first mobile terminal 100-1 may select some information from the information 861 about the file capable of being transmitted from the second mobile terminal 300 to the first mobile terminal 100-1 and may receive the selected information.

Transmission and/or reception of data may be simultaneously performed by the first mobile terminal 100-1 and the second mobile terminal 300. Therefore, the second mobile terminal 300 may display information 871 about a file, which is capable of being transmitted from the first mobile terminal 100-1 to the second mobile terminal 300, on the display unit of the second mobile terminal 300 as in FIG. 8D. Also, the user of the second mobile terminal 300 may select some information from the information 871 about the file capable of being transmitted from the first mobile terminal 100-1 to the second mobile terminal 300 and may receive the selected information.

Figure 8E:
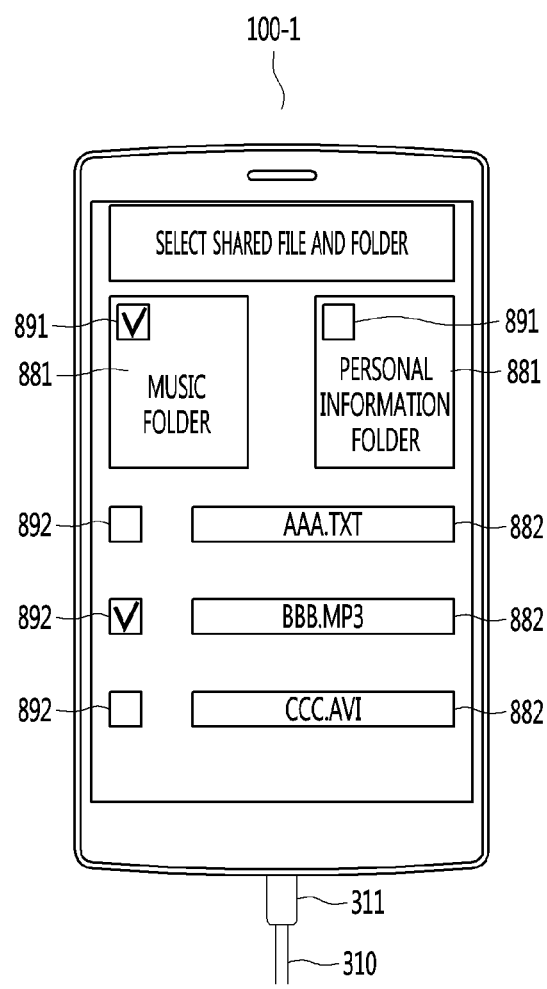

Referring to FIG. 8E, the first mobile terminal 100-1 may supply power to the second mobile terminal 300 under a limited condition.

In a state where the first mobile terminal 100-1 is connected to the second mobile terminal 300 through the cable and the controller 180 of the first mobile terminal 100-1 designates the first mobile terminal 100-1 as a mobile terminal capable of data transmission, when a data limitation condition is set in the first mobile terminal 100-1, the first mobile terminal 100-1 may supply the data to the second mobile terminal 300 under the data limitation condition.

For example, as in FIG. 8E, the controller 180 of the first mobile terminal may designate a file or a folder, which is capable of being transmitted to the second mobile terminal 300, in data stored in the memory 170. For example, the first mobile terminal 100-1 may transmit only a file or a folder 881, designated as transmittable, to the second mobile terminal 300. Also, only a file or a folder designated as transmittable from the first mobile terminal 100-1 to the second mobile terminal 300 may be included in a selectable screen as in FIG. 8D.

For example, as in FIG. 8E, the controller 180 may allow the display unit 151 to display files stored in the memory 170 and may transmit only a selected file or folder 891 or 892 to the second mobile terminal 300. Also, only the selected file or folder 891 or 892 may be included in a selectable screen as in FIG. 8D and include a format 882 of the corresponding files.

As another example, the first mobile terminal 100-1 may limit a range of a data transmission speed between the first mobile terminal 100-1 and the second mobile terminal 300. The data transmission speed may be controlled by the controller 180, and depending on the case, may be limited based on a selection by the user of the first mobile terminal 100-1.

As another example, the first mobile terminal 100-1 may limit data transmission between the first mobile terminal 100-1 and the second mobile terminal 300, based on a designated kind of file format. For example, data transmission may be limited to a file where an extension is 'hwp'.

As another example, the first mobile terminal 100-1 may limit data transmission between the first mobile terminal 100-1 and the second mobile terminal 300, based on file size. For example, data transmission may be limited to a file where a capacity is 1 Mb or less.

As another example, the first mobile terminal 100-1 may limit data transmission between the first mobile terminal 100-1 and the second mobile terminal 300, based on a time for which a file is written. For example, a range may be limited to a file which is written for less than one hour.

Therefore, the user of the first mobile terminal 100-1 may obtain an effect of transmitting only information about a file or a folder, which is to be transmitted, to the second mobile terminal 300.

Figure 9A:
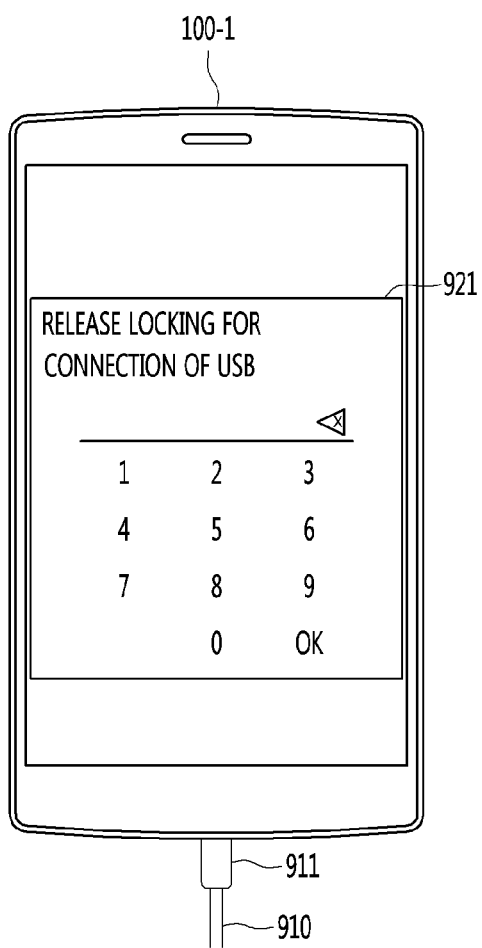
FIGS. 9A and 9B are diagrams for describing a method of connecting a mobile terminal and a cable after safety is checked in connecting the mobile terminal to the cable, associated with another embodiment of the present invention.
Figure 9B:
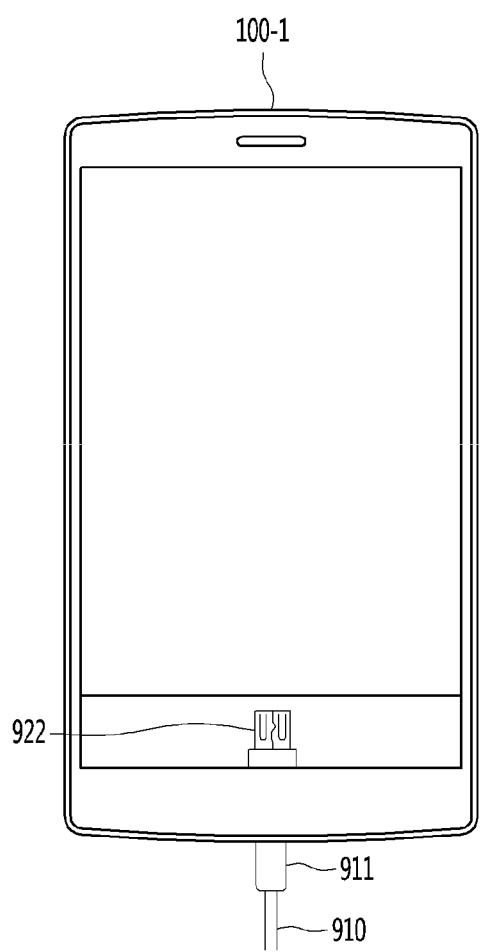

FIGS. 9A and 9B are diagrams for describing a method of connecting a mobile terminal and a cable after safety is checked in connecting the mobile terminal to the cable, associated with another embodiment of the present invention.

Referring to FIGS. 9A and 9B, a cable 910 may be connected to the interface unit 160 of the first mobile terminal via a connector 911. The cable 910 may include a memory (not shown).

When the cable 910 including the memory is connected to the first mobile terminal, a problem such as virus infection may occur.

When the cable 910 is connected to the interface unit 160 of the first mobile terminal, the controller 180 of the first mobile terminal 100-1 may not immediately transmit and/or receive data but may allow the display unit 151 of the first mobile terminal 100-1 to display a lock screen 921.

Only when a gesture for releasing the lock screen 921 is input, the controller 180 of the first mobile terminal 100-1 may transmit and/or receive data through the cable. Therefore, only when the gesture for releasing the lock screen 921 is input, the controller 180 of the first mobile terminal 100-1 may display a connection mark 922 of the cable 910 on the display unit 151.

Therefore, an effect of solving a problem where a mobile terminal is damaged by the cable 910 having a problem such as BadUsb may be obtained.

According to the present invention, when the cable connected to the second mobile terminal 300 is connected to the interface unit of the first mobile terminal 100-1, the controller 180 of the first mobile terminal 100-1 gets an authority to control a portion of the first mobile terminal 100-1. Also, the controller 180 of the first mobile terminal 100-1 gets an authority to control a portion of the second mobile terminal 300. Accordingly, the controller 180 of the first mobile terminal 100-1 may control the second mobile terminal to transmit and/or receive at least one of data and power to and/or from the second mobile terminal, based on the gotten authority.

That is, when the first mobile terminal 100-1 is connected to the second mobile terminal 300 through the cable, the first mobile terminal 100-1 is connected to the second mobile terminal 300 in an equal relationship instead of a master-slave relationship. Accordingly, as described above, by assigning an authority to transmit and/or receive power and data, the first mobile terminal 100-1 and the second mobile terminal 300 may transmit and/or receive the data and the power therebetween.

The above-described present invention may be implemented as a computer-readable code in a medium recording a program. A computer-readable medium includes all kinds of recording devices storing data readable by a computer system. Examples of the computer-readable medium include a hard disk driver (HDD), a solid state disk (SSD), a silicon disk driver (SDD), a ROM, a RAM, a CD-ROM, a magnetic tape, a floppy disk, and an optical data storage device, and moreover, include a case which is implemented in the form of carrier waves (for example, transmission over Internet). Also, the computer may include the controller 180 of a terminal.

Therefore, the detailed description should not be construed as limited and should be considered as exemplary in all aspects. The scope of the present invention should be determined by rational interpretation of claims, and all modifications within the equivalent scope of the present invention are included in the scope of the present invention.

The invention claimed is:

1. A first mobile terminal comprising:
a memory;
a display unit;
an interface unit connected to a cable through which at least one of data and power is transmitted; and
a controller configured to:
obtain a first power information including a remaining power of a battery of the first mobile terminal,
receive, through the cable, a second power information including a remaining power of a battery of a second mobile terminal,
compare the remaining power of the battery of the first mobile terminal with the remaining power of the battery of the second mobile terminal, and
transmit, through the cable, a power to the second mobile terminal if the remaining power of the battery of the first mobile terminal is greater than the remaining power of the battery of the second mobile terminal.

2. The first mobile terminal of claim 1, wherein
the controller, when the remaining power of the battery of the first mobile terminal is greater than the remaining power of the battery of the second mobile terminal, the controller designates the first mobile terminal as a terminal which transmits power.

3. The first mobile terminal of claim 1, wherein
the controller, when the remaining power of the battery of the first mobile terminal is smaller than the remaining power of the battery of the second mobile terminal, the controller designates the first mobile terminal as a terminal which receives power.

4. The first mobile terminal of claim 1, wherein
the first power information further includes information about a transmission limitation power of the battery of the first mobile terminal, and
when the first mobile terminal is designated as a terminal which transmits power, and the remaining power amount of the battery of the first mobile terminal reaches the transmission limitation power of the battery, the controller stops transmission of the power.

5. The first mobile terminal of claim 1, wherein, when the first mobile terminal is designated as a terminal which transmits power, the controller determines whether a lock state of the first mobile terminal is set, and when the lock state is not set, the controller transmits power to the second mobile terminal.

6. The first mobile terminal of claim 1, wherein,
when the first mobile terminal is designated as a terminal which transmits power, the controller determines whether a lock state of the first mobile terminal is set,
when the lock state is set, the controller transmits power to the second mobile terminal at a low speed, and
when the lock state is not set, the controller transmits the power to the second mobile terminal at a high speed.

7. The first mobile terminal of claim 1, wherein, when the first mobile terminal is connected to the second mobile terminal through the cable and a lock state of the first mobile terminal and the second mobile terminal is set, when and the lock state of the first mobile terminal is first released, the controller designates the first mobile terminal as a terminal which transmits power.

8. The first mobile terminal of claim 1, wherein, when the first mobile terminal is designated as a terminal which transmits power, when and the power is being transmitted to the second mobile terminal, the controller controls the display unit to display a power supplying state.

9. The first mobile terminal of claim 1, wherein the cable is a USB C type.

10. The first mobile terminal of claim 1, wherein the controller receives selection of information about one or more files or folders to transmit the second mobile terminal, and transmits the selected one or more files or folders to the second mobile terminal.

11. The first mobile terminal of claim 1, wherein the controller receives selection of information about one or more files or folders accessible by the second mobile terminal, and enables the second mobile terminal to access the selected one or more files or folders.

12. The first mobile terminal of claim 1, wherein, when a lock state of the first mobile terminal is released, the controller enables the second mobile terminal to access the memory of the first mobile terminal.

13. The first mobile terminal of claim 12, wherein the controller partially limits and authority of the second mobile terminal to access files and folders stored in the memory of the first mobile terminal.

14. The first mobile terminal of claim 1, wherein the controller is configured to:
control the display unit to display files and folders stored in the second mobile terminal,
receive a selection of at least one or more of the displayed files and folders, and download the selected one or more of the displayed files and folders.

15. The first mobile terminal of claim 1, wherein
while only a portion of the power or the data is being transmitted or received, when a transmission or reception target of the power or the data is changed, the controller controls the display unit to display a lock screen indicating a lock state, and
when the lock state is released, the controller completes changing of the transmission or reception target.

16. The first mobile terminal of claim 1, wherein the controller simultaneously performs transmission or reception of the data and the power.

17. A first mobile terminal comprising:
a memory;
a display unit;
an interface unit connected to a cable through which at least one of data and power is transmitted; and
a controller configured to:
obtain a first power information including a remaining power of a battery of the first mobile terminal,
receive, through the cable, a second power information including a remaining power of a battery of a second mobile terminal,
compare the remaining power of the battery of the first mobile terminal with the remaining power of the battery of the second mobile terminal, and
transmit, through the cable, a power to the second mobile terminal if the remaining power of the battery of the first mobile terminal is greater than the remaining power of the battery of the second mobile terminal
wherein the controller obtains connection information including a time when the first mobile terminal is connected to the cable and a time when the second mobile terminal is connected to the cable, and
wherein the controller compares the time when the first mobile terminal is connected to the cable with the time when the second mobile terminal is connected to the cable, and when the cable is first connected to the first mobile terminal, the controller determines the first mobile terminal as a power transmission terminal.

18. A first mobile terminal comprising:
a memory;
a display unit;
an interface unit connected to a cable through which at least one of data and power is transmitted; and
a controller configured to:
obtain a first power information including a remaining power of a battery of the first mobile terminal,
receive, through the cable, a second power information including a remaining power of a battery of a second mobile terminal,
compare the remaining power of the battery of the first mobile terminal with the remaining power of the battery of the second mobile terminal, and
transmit, through the cable, a power to the second mobile terminal if the remaining power of the battery of the first mobile terminal is greater than the remaining power of the battery of the second mobile terminal,
wherein when the cable is connected to the interface unit, the controller controls the display unit to display a data transmission or reception blocking screen and blocks reception of data through the interface unit, and wherein when blocking of the data reception is released, the controller allows reception of data through the interface unit.

19. A first mobile terminal comprising:

a memory;

a display unit;

an interface unit connected to a cable through which at least one of data and power is transmitted; and a controller configured to:

obtain a first power information including a remaining power of a battery of the first mobile terminal, receive, through the cable, a second power information including a remaining power of a battery of a second mobile terminal, compare the remaining power of the battery of the first mobile terminal with the remaining power of the battery of the second mobile terminal, and transmit, through the cable, a power to the second mobile terminal if the remaining power of the battery of the first mobile terminal is greater than the remaining power of the battery of the second mobile terminal, wherein when the cable connected to the second mobile terminal is connected to the interface unit, the controller is further configured to:

assign, to the second mobile terminal, an authority to control a portion of the first mobile terminal, get an authority to control a portion of the second mobile terminal, and control the second mobile terminal according to the assigned authority to transmit or receive at least one of data and power to or from the second mobile terminal.

20. A first mobile terminal comprising:

a memory;

a display unit;

an interface unit connected to a cable through which at least one of data and power is transmitted; and a controller is configured to, obtain a first power information including a remaining power of a battery of the first mobile terminal, receive, through the cable, a second power information including a remaining power of a battery of a second mobile terminal, compare the remaining power of the battery of the first mobile terminal with the remaining power of the battery of the second mobile terminal, and receive, through the cable, a power from the second mobile terminal if the remaining power of the battery of the first mobile terminal is smaller than the remaining power of the battery of the second mobile terminal.

* * * * *